(12) United States Patent
Ueno et al.

(10) Patent No.: US 7,541,733 B2
(45) Date of Patent: Jun. 2, 2009

(54) LIGHT-EMITTING ELEMENT, METHOD FOR PRODUCING THE SAME AND DISPLAY DEVICE

(75) Inventors: Iwao Ueno, Kyotanabe (JP); Masakazu Tanahashi, Osaka (JP); Emiko Igaki, Amagasaki (JP)

(73) Assignee: Panasonic Corporation, Osaka (JP)

( * ) Notice: Subject to any disclaimer, the term of this patent is extended or adjusted under 35 U.S.C. 154(b) by 892 days.

(21) Appl. No.: 10/503,523

(22) PCT Filed: Aug. 1, 2003

(86) PCT No.: PCT/JP03/09841

§ 371 (c)(1),
(2), (4) Date: Aug. 3, 2004

(87) PCT Pub. No.: WO2004/016049

PCT Pub. Date: Feb. 19, 2004

(65) Prior Publication Data

US 2005/0174037 A1    Aug. 11, 2005

(30) Foreign Application Priority Data

Aug. 8, 2002    (JP)    ............................. 2002-231378
Dec. 6, 2002    (JP)    ............................. 2002-355903

(51) Int. Cl.
*H01J 1/62*    (2006.01)
*H01J 63/04*    (2006.01)

(52) U.S. Cl. ...................... 313/502; 313/483; 313/494; 313/498; 313/506; 313/509; 445/23

(58) Field of Classification Search ......... 313/498–503, 313/483, 494; 445/23
See application file for complete search history.

(56) References Cited

U.S. PATENT DOCUMENTS 4,894,116 A * 1/1990 Barrow et al. .................. 216/5

(Continued)

FOREIGN PATENT DOCUMENTS

CN    1293333 A    5/2001

(Continued)

OTHER PUBLICATIONS

Shionoya et al., "Optical Property Handbook", Asakura shoten, pp. 523-531, Mar. 1984 (with partial English translation).

(Continued)

*Primary Examiner*—Nimeshkumar D. Patel
*Assistant Examiner*—Thomas A Hollweg
(74) *Attorney, Agent, or Firm*—Hamre, Schumann, Mueller & Larson, P.C.

(57) ABSTRACT

A light-emitting element of the present invention, includes: a porous light-emitting body including an insulator having a void and an inorganic phosphor particle; and at least two electrodes provided so as to contact with a surface of the light-emitting body. A voltage is applied to the at least two electrodes so as to generate discharge, and the light-emitting body is pumped by the discharge so as to emit light. Thereby, a light-emitting element that is reduced in a deterioration of brightness and a degradation of reliability of phosphors and does not require the vacuum encapsulation and the application of a high voltage, which are required for glow discharge, and still-higher level of thin-film technology can be provided. By arranging these light-emitting elements two-dimensionally in a matrix form, a flat display device with a simple configuration can be provided at a low cost.

28 Claims, 16 Drawing Sheets

U.S. PATENT DOCUMENTS 6,373,188 B1 * 4/2002 Johnson et al. ............. 313/506
2002/0031688 A1 3/2002 Tanabe et al.

FOREIGN PATENT DOCUMENTS

| CN | 1344125 A | 4/2002 |
|---|---|---|
| EP | 1 126 497 | 8/2001 |
| JP | 59-018558 | 1/1984 |
| JP | 60-182689 | 9/1985 |
| JP | 6-096859 | 4/1994 |
| JP | 6-248261 | 9/1994 |
| JP | 11-162640 | 6/1999 |
| JP | 11-162641 | 6/1999 |
| JP | 11-288785 | 10/1999 |
| JP | 2002-190250 | 7/2002 |
| JP | 2003-183642 | 7/2003 |

OTHER PUBLICATIONS

Kobayashi, "Physics of Light-Emission", Asakura shoten, pp. 10-11, Jun. 2000 (with partial English translation).

* cited by examiner

LIGHT-EMITTING ELEMENT, METHOD FOR PRODUCING THE SAME AND DISPLAY DEVICE

TECHNICAL FIELD

The present invention relates to a light-emitting element, a method for producing the same and a display device in which light-emitting elements are arranged.

BACKGROUND ART

Recently, attention has been drawn to a flat-type display as a display device, for example, a plasma display has been put into practical use. The plasma display has received attention because it permits upsizing easily and allows high brightness and wide viewing-angle to be attained. However, since the configuration of the display is complicated and a manufacturing process thereof also is complicated, the cost of the current display still remains high, although there has been improvement.

In Embodiment 11, the light-emitting body 143 was applied at an upper layer portion of the substrate 30 and a heat treatment was conducted thereto. However, the light-emitting body 143 may be applied on a PET film, for instance, the PET film may be peeled off and a heat treatment may be conducted, and then a substrate may be attached thereto. Herein, as an adhesive for this step, a colloidal silica aqueous solution or a colloidal alumina aqueous solution was used, which was dried at 100 to 200° C., whereby a contact strength could be increased.

As displays utilizing discharge other than the plasma display that has been put into practical use, a proposed one is as described in JP H11(1999)-162640 A, such that, within an enclosing container, organic phosphor molecules are absorbed on at least a surface of porous particles (metal oxides or high-polymer spherical particles), and a positive electrode and a negative electrode further are formed on a surface thereof. A DC electric field is applied to these electrodes so as to induce discharge, thus allowing light-emission. Furthermore, JP S59(1984)-18558 A proposes that light is emitted by using ultraviolet rays generated by glow-discharge of a rare gas, such as He and Xe, in a vacuum between electrodes arranged at phosphors.

The above light-emitting element described in JP H11 (1999)-162640 A has the problems of a deterioration of brightness and a degradation of reliability, which are due to vaporization (sublimation) of organic phosphor molecules caused by a voltage load or heat generated by discharge.

Furthermore, in order to generate glow discharge, the invention described in JP S59(1984)-18558 A requires the application of a high voltage and the vacuum encapsulation of a rare gas.

DISCLOSURE OF THE INVENTION

In view of the above-stated problems, the present invention provides a light-emitting element which has reduced deterioration of brightness and degradation of reliability of phosphors and does not require the vacuum encapsulation and the application of a high voltage, which are required for glow discharge, and still-higher level of thin-film technology, and a method for producing the same. The present invention further provides a display with a simple configuration and at a low cost.

The present invention is directed to a light-emitting element including a porous light-emitting body including an insulator having a void and an inorganic phosphor particle; and at least two electrodes provided so as to contact with a surface of the light-emitting body. A voltage is applied to the at least two electrodes so as to generate discharge, and the light-emitting body is pumped by the discharge so as to emit light.

A display device of the present invention is obtained by arranging the above-stated light-emitting elements in a matrix form.

A method for producing a light-emitting element of the present invention is for producing the above-stated light-emitting element and includes the steps of: a first step of applying an inorganic phosphor paste on a surface of a sheet-form porous body made up of the insulator having a void; a second step of conducting a heat treatment for the insulator so as to form the porous light-emitting body; and a third step of forming the at least two electrodes contacting with the surface of the light-emitting body.

Another method for producing a light-emitting element of the present invention is for producing the above-stated light-emitting element and includes the steps of: a first step of applying a paste containing an insulative fiber and an inorganic phosphor particle on a conductive substrate and conducting a heat treatment so as to form the porous light-emitting body, and a second step of forming the electrodes so as to contact with the surface of the light-emitting body.

Still another method for producing a light-emitting element of the present invention is for producing the above-stated light-emitting element and includes the steps of: a first step of shaping a paste containing an insulative fiber and an inorganic phosphor particle and conducting a heat treatment so as to form the porous light-emitting body, and a second step of forming the at least two electrodes so as to contact with the surface of the light-emitting body.

BEST MODE FOR CARRYING OUT THE INVENTION

Figure 1:
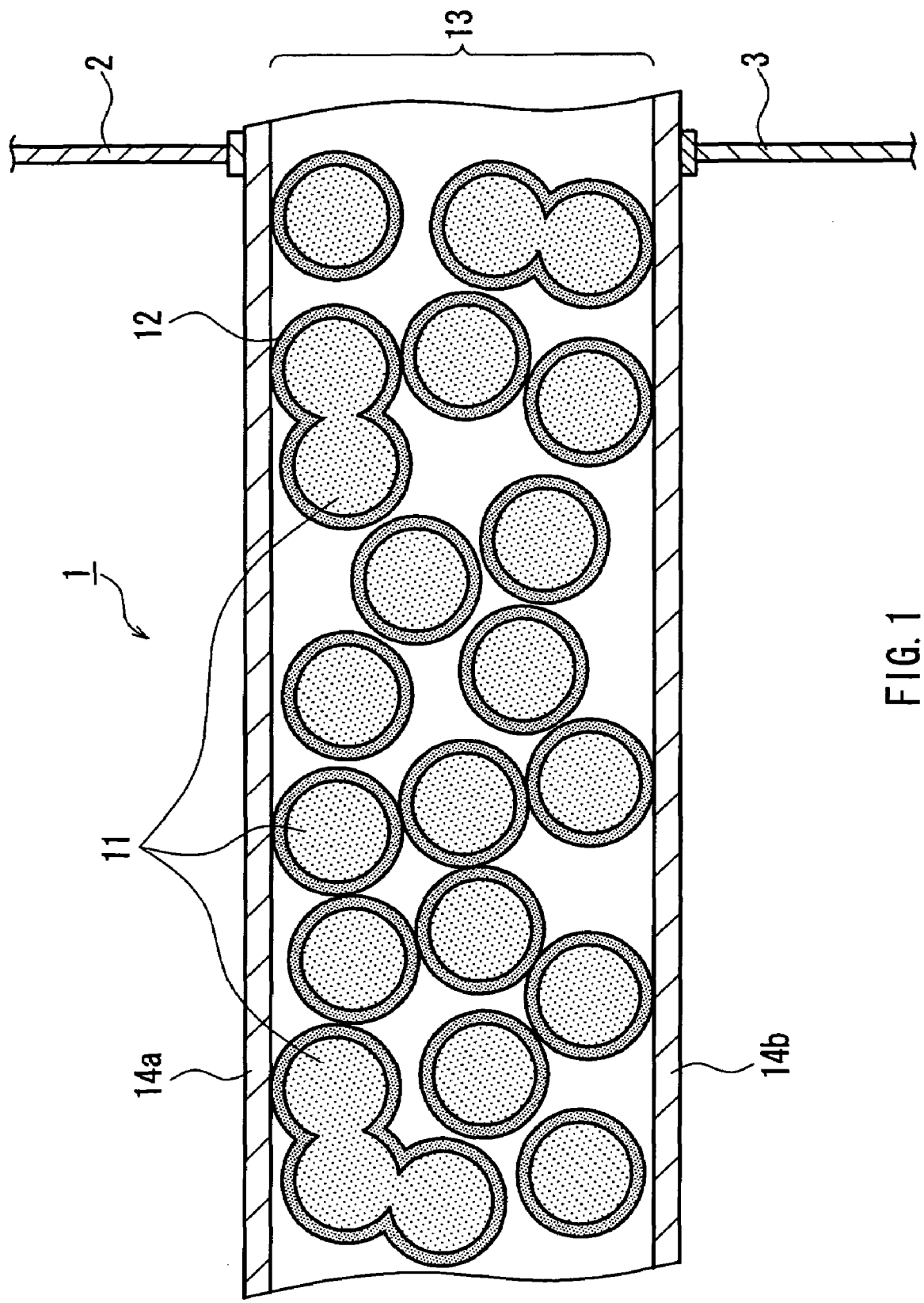
FIG. 1 is a cross-sectional view of a light-emitting element according to Embodiment 1 of the present invention.

A light-emitting element of the present invention is a light-emitting element including a porous light-emitting body on a surface of which an insulative inorganic substance is formed and at least two electrodes contacting with a surface of the light-emitting body. A voltage is applied to the light-emitting element so as to generate surface creepage at a surface of the light-emitting body and inside thereof, and ultraviolet light generated by the surface creepage pumps the light-emitting body so as to emit light.

Another light-emitting element of the present invention includes a porous light-emitting body including an assembly of inorganic phosphor particles whose surfaces are coated with an insulative inorganic substance, and at least two electrodes contacting with a surface of the light-emitting body. A voltage is applied to the light-emitting element so as to generate surface creepage at a surface of the light-emitting body and inside thereof, and, for example, ultraviolet light generated by the surface creepage pumps the light-emitting body so as to emit light.

Furthermore, as the insulative inorganic substance (insulative metal oxide), at least one substance selected from the group consisting of $Y_2O_3$, $Li_2O$, $MgO$, $CaO$, $BaO$, $SrO$, $Al_2O_3$, $SiO_2$, $MgTiO_3$, $CaTiO_3$, $BaTiO_3$, $SrTiO_3$, $ZrO_2$, $TiO_2$, $B_2O_3$, $PbTiO_3$, $PbZrO_3$ and $PbZrTiO_3$ (PZT) may be used. These materials are stable substances having considerably small standard free energy of formation of oxides $\Delta G_f^0$ (e.g., −100 kcal/mol or less at room temperatures) or are substances having a capacity of 100 or more as a dielectric constant. Thus, they have a high insulation resistance value and facilitate the generation of the surface creepage, and can maintain an insulative metal oxide property that tends not to be reduced even when the surface creepage occurs.

Furthermore, the light-emitting element may be provided with a through hole in the light-emitting body between the electrodes that is bored on purpose using a needle or the like, which facilitates the generation of the surface creepage even at the inside of the light-emitting body.

Furthermore, in the light-emitting element, a substance with a resistance lower than that of an insulative metal oxide may be dispersed within the light-emitting body between the electrodes, which facilitates the generation of the surface creepage at the surface and even at the inside of the light-emitting body.

Furthermore, in the light-emitting element, an inside of the light-emitting body may be filled with inert gas so as to form an atmosphere that facilitates the generation of ultraviolet light.

Another light-emitting element of the present invention includes: a porous light-emitting body including an insulator having a void and an inorganic phosphor particle; and at least two electrodes provided so as to contact with a surface of the light-emitting body. A voltage is applied to the at least two electrodes so as to generate discharge, and ultraviolet light generated by the discharge pumps the light-emitting body so as to emit light.

The insulator having a void is at least one selected from a fibrous structure and a foam having continuous bubbles. This configuration facilitates the attachment of the inorganic phosphor particle and the discharge. The insulator preferably is colorless or white, because this does not pose any obstacles for making red, blue and green phosphors emit light.

Furthermore, the light-emitting body preferably is one obtained by attaching the inorganic phosphor particle to a surface of the insulator having a void.

Furthermore, preferably, the insulator fiber having a void is an inorganic substance that contains at least one type selected from the group consisting of Al, Si, Ca, Mg, Ti, Zn and B. These materials have a high insulation resistance value and have excellent heat-resistance properties and resistance to acids and alkalis. Therefore, in the light-emitting element, the discharge becomes likely to occur and a configuration resistant to heat and chemicals can be obtained.

Furthermore, preferably, the fiber is one obtained by crushing insulative ceramic or glass. They have a high insulation resistance value and have excellent heat-resistance properties and resistance to acids and alkalis, and therefore in the light-emitting element, the discharge becomes likely to occur and a configuration resistant to heat and chemicals can be obtained.

Preferably, the fiber is a heat-resistant synthetic fiber with a heat distortion temperature of 220° C. or more. The heat distortion temperature refers to a temperature at which the fiber is not molten or softened. Since the fiber is just charged into the light-emitting body, it is sufficient for the fiber simply to hold its shape without being molten or softened. As examples of the heat-resistant synthetic fiber having a heat distortion temperature of 220° C. or more, well-known heat-resistant fibers are available including: fluorine fibers such as polytetrafluoroethylene (PTFE), tetrafluoroethylene-per-fluoroalkylvinylether copolymer (PFA), polychlorotrifluoroethylene (PCTFE), polyvinylidene fluoride (PVDF), polyvinyl fluoride (PVF), tetrafluoroethylene-hexafluoropropylene copolymer (FEP) and tetrafluoroethylene-ethylene copolymer (PETFE); polyimide fiber, aramid fiber (including meta group and para group), polyester fiber, polyamide fiber, polyamideimide fiber, polyesterimide fiber, polyether fiber, polyetherether fiber and polysulfone fiber.

Furthermore, the inorganic phosphor particle may be covered with an insulative inorganic substance, whereby the discharge can be generated with efficiency.

Furthermore, as the insulative inorganic substance, at least one substance selected from the group consisting of $Y_2O_3$, $Li_2O$, $MgO$, $CaO$, $BaO$, $SrO$, $Al_2O_3$, $SiO_2$, $MgTiO_3$, $CaTiO_3$, $BaTiO_3$, $SrTiO_3$, $ZrO_2$, $TiO_2$, $B_2O_3$, $PbTiO_3$, $PbZrO_3$ and $PbZrTiO_3$ (PZT) may be used. These materials are stable substances having considerably small standard free energy of formation of oxides AGF (e.g., −100 kcal/mol or less at room temperatures) or are substances having a capacity of 100 or more as a dielectric constant. Thus, they have a high insulation resistance value and facilitate the generation of the discharge, and are insulative metal oxides that tend not to be reduced even when the discharge occurs and have excellent durability.

Furthermore, a substance with a resistance lower than that of the insulative fiber may be dispersed within the light-emitting body between the electrodes, which facilitates the generation of the discharge at a surface and even at the inside of the light-emitting body.

An inside of the light-emitting body may be an atmosphere at atmospheric pressure or may be filled with inert gas, which facilitates the generation of ultraviolet light.

Furthermore, assuming that a weight of the insulative fiber is 1, the mixture may be conducted so that a weight of the inorganic phosphor particle is within a range of 0.1 to 10.0. This facilitates the generation of the discharge at a surface and even at the inside of the light-emitting body.

Furthermore, preferably, the insulative fiber has a diameter of 0.1 to 20.0 µm and a length of 0.5 to 100 µm, and the inorganic phosphor particle has an average particle diameter of 0.1 to 5.0 µm. This facilitates the generation of the discharge at a surface and even at the inside of the light-emitting body.

Next, in the first method for producing a light-emitting element of the present invention, it is preferable that the inorganic phosphor paste contains an inorganic phosphor particle whose surface is covered with an insulative inorganic substance. According to this method, a light-emitting element having a configuration facilitating the efficient generation of the discharge can be produced.

Furthermore, the covering with the insulative inorganic substance may be conducted by immersing the inorganic phosphor particle in a metal complex solution, a metal alkoxide solution or a colloidal solution, followed by a heat treatment. According to this method, a light-emitting element having a configuration facilitating the efficient generation of the discharge can be produced.

The covering with the insulative inorganic substance may be conducted by attaching the insulative inorganic substance on a surface of the inorganic phosphor particle by any one method of evaporation, sputtering and CVD. According to this method, a light-emitting element having a configuration facilitating the efficient generation of the discharge can be produced.

Furthermore, after the second step and before the third step, a surface of the light-emitting body is covered with an insulative inorganic substance by immersing the light-emitting body in a metal complex solution or a metal alkoxide solution, followed by a heat treatment. According to this method, a light-emitting element having a configuration facilitating the efficient generation of the discharge can be produced.

Additionally, after the second step and before the third step, an insulative inorganic substance may be attached to a surface of the light-emitting body by any one method of evaporation, sputtering and CVD. According to this method, a light-emitting element having a configuration facilitating the efficient generation of the discharge can be produced.

Furthermore, a display device can be produced by applying three types of inorganic phosphor pastes including red, blue and green in a stripe form.

Furthermore, a light-shielding film or a groove may be provided between different colored inorganic phosphors. According to this method, a light-emitting element with distinctness and reduced spreading of colors can be produced.

Furthermore, the inorganic phosphor paste may contain a foaming agent, which allows a light-emitting element having a porous configuration to be produced easily.

In the second and the third methods for producing a light-emitting element of the present invention, preferably, after the first step and before the second step, the light-emitting body is immersed in a metal complex solution, a metal alkoxide solution or a colloidal solution, followed by a heat treatment, whereby a surface of the inorganic phosphor particle is covered with an insulative inorganic substance. According to this method, a light-emitting element having a configuration facilitating the efficient generation of the discharge can be produced.

Furthermore, by arranging the above-stated light-emitting elements of the present invention in a matrix form, a display device with a simple configuration can be produced at a low cost.

The following are descriptions concerning specific embodiments.

Embodiment 1

The following describes Embodiment 1 that is directed to a light-emitting element of the present invention and a display device using the same, with reference to the drawings.

Figures 2A, 2B:
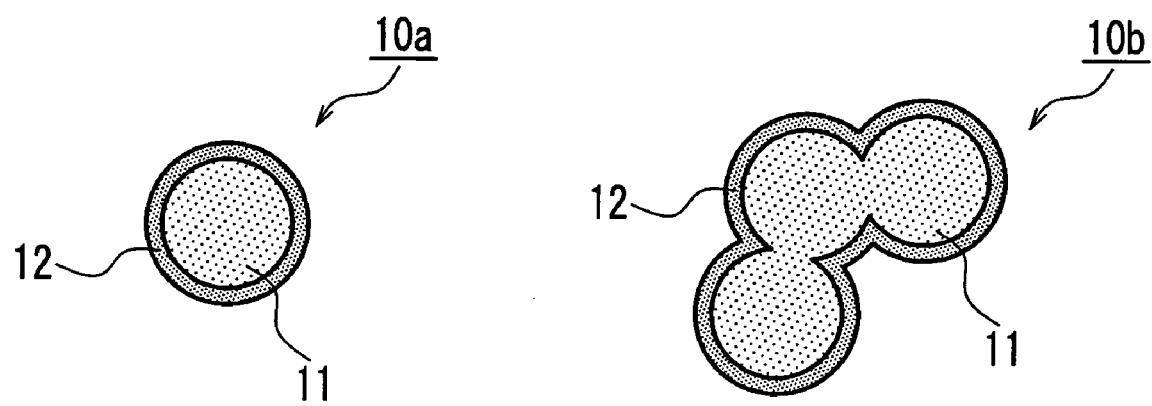
FIG. 2A is a cross-sectional view of light-emitting particles of Embodiments 1 and 3 of the present invention.
FIG. 2B is a cross-sectional view of light-emitting particles of Embodiments 1 and 3 of the present invention.

FIG. 1 is a cross-sectional view of a light-emitting element 1 according to Embodiment 1 of the present invention, and FIGS. 2A and 2B are cross-sectional views of light-emitting particles constituting the light-emitting element 1 shown in FIG. 1, where FIG. 2A shows a primary particle and FIG. 2B shows a secondary particle. Reference numeral 11 denotes an inorganic phosphor particle that is a primary particle or a flocculated secondary particle, 12 denotes a coating layer made of MgO that is an insulative metal oxide, 13 denotes a porous light-emitting body made up of light-emitting particles 10a and 10b shown in FIG. 2A and FIG. 2B, 14a and 14b denote ITO transparent electrodes that are provided at surfaces of the light-emitting body 13 so as to have a predetermined gap therebetween and 1 denotes the light-emitting element.

The following describes a method for producing the light-emitting element 1 of Embodiment 1. Firstly, $Mg(OC_2H_5)_2$ powder (1 molar ratio) as metal alkoxide was mixed by stirring with $CH_3COOH$ (10 molar ratio), $H_2O$ (50 molar ratio) and $C_2H_5OH$ (39 molar ratio) at room temperature, whereby a substantially transparent sol/gel solution was prepared. Next, inorganic phosphor powder (2 molar ratio) was mixed by stirring into the sol/gel solution. Thereafter, the mixed solution underwent centrifugal separation so as to take powder only therefrom to a tray made of stainless steel, which was allowed to dry at 150° C. all day and night. Next, the dried powder was calcined in the air at 400 to 600° C. for 2 to 5 hours, so that light-emitting particles having a coating layer 12 of MgO on a surface of the particles 11 (10a (primary particle), 10b (secondary particle)) (See FIG. 2) were manufactured. The light-emitting particles 10a and 10b each were produced using, as the inorganic phosphor particles 11, three types of materials: $BaMgAl_{10}O_{17}:Eu^{2+}$ (blue); $Zn_2SiO_4$: $Mn^{2+}$ (green); and $YBO_3:Eu^{3+}$ (red), which had an average particle diameter of 2 to 3 µm. As a result of the observation with a transmission electron microscope (TEM), both of the light-emitting particles 10a and 10b had thicknesses of the coating layer 12 from 0.1 to 2.0 µm. Next, these light-emitting particles 10a and 10b were mixed with 5 wt % polyvinyl alcohol and were granulated, followed by shaping through the application of a pressure at about 50 MPa into a disk shape with a diameter of 10 mm and a thickness of 1 mm. Next, a heat treatment was conducted thereto in an atmosphere of nitrogen at 450 to 1200° C. for 2 to 5 hours, whereby a porous light-emitting body 13 was produced. Subsequently, indium tin oxide alloy (ITO) transparent electrodes 14a and 14b were formed by sputtering at upper and lower faces of the light-emitting body 13, whereby a light-emitting element 1 was obtained.

A method for letting this light-emitting element 1 emit light will be described below. Firstly, a voltage was applied between the electrodes 14a and 14b via lead wires 2 and 3. The voltage may be alternating current or direct current. The application of the voltage causes the generation of surface creepage at the coating layer 12. The discharge occurs continuously like a chain reaction, thus emitting ultraviolet light and visible light. Then, the thus generated ultraviolet light optically pumps the particles 11, thereby emitting visible light. Once the surface creepage begins, the discharge repeats like a chain reaction so as to generate ultraviolet light and visible light, and therefore in order to suppress adverse effects of this light on the particles 10a and 10b, a value of the voltage preferably is reduced after the initiation of the light-emission.

When the voltage was applied at about 0.5 to 1.0 kV/mm by means of an AC power source or a DC power source, the surface creepage occurred, followed by the initiation of light-emission. A value of the current at this time was 0.1 mA or smaller. Furthermore, once the light-emission was initiated, the light-emission continued even when the value of the voltage was reduced to 50 to 80% of that applied at the initial state. It was confirmed that the light-emitting element had a high brightness, a high contrast, a high recognition capability and a high reliability for all of the three colors: blue; green; and red. That is to say, although the light-emitting element 1 of Embodiment 1 has a configuration close to that of an inorganic EL, a light-emission mechanism thereof is totally different. In Embodiment 1, the light (ultraviolet light) generated through the surface creepage by the application of the voltage pumps the particles 11, thus enabling light-emission (photoluminescence). On the other hand, the light-emission principle of the inorganic EL is as described in the section of

BACKGROUND ART.

Therefore, although the phosphor used in the inorganic EL is a semiconductor light-emitting body typified by $ZnS:Mn^{2+}$ and $GaP:N$, the particles 11 of Embodiment 1 may be an insulator or a semiconductor. That is, even when a phosphor particle of a semiconductor is used, the light-emission can continue without the generation of short-circuit because the particles are covered with the insulative metal oxide uniformly.

Furthermore, this light-emitting element 1 does not require vacuum encapsulation and a high voltage value that are required for the glow discharge, and is expected to be a light-emitting element having a high brightness, a high contrast, a high recognition capability and a high reliability in the air. Therefore, as compared with the organic EL and the inorganic EL, this light-emitting element can have a simple configuration and can be produced easily (does not require the use of higher level of thin-film technology). In addition, it was found that efficient surface creepage significantly depended on a filling factor of the particles 10a and 10b. That is, since Embodiment 1 employs the porous light-emitting body 13, the surface creepage occurs not only at the surface of the light-emitting body 13 but also at the inside thereof, whereby the particles 11 can emit light effectively. If a distance between the particles 10a and 10b that constitute the light-emitting body 13 becomes too large, air discharge may occur, and therefore care should be given to this point. Ideally, it is desirable for the particles 10a and 10b to make point-contact three-dimensionally with at least one adjacent particle 10a or 10b.

When a sintered density of the light-emitting body 13 is increased (e.g., 90% or higher of a theoretical density), the surface creepage occurs only at the surface of the light-emitting body 13, thus degrading the light-emission efficiency. Therefore, it is desirable that the light-emission body 13 has a porous configuration with a density that is 90% or less of the theoretical density. However, when pores of the light-emitting body 13 become too large in size, which means an excessively large porosity, the light-emission efficiency may deteriorate, and moreover the surface creepage is expected to be unlikely to occur. Therefore, ideally, it appears appropriate that the light-emitting body 13 has a sintered density of 50 to 90% of the theoretical density. Herein, if a mechanical strength is provided therewith, there is no need to apply a heat treatment for curing. It was confirmed that a shaped body (green compact) that was not subjected to any heat treatment also could emit light by the similar application of a voltage. Also, it was confirmed that a shaped body (green compact) with which polyvinyl alcohol had not been mixed could emit light similarly.

The coating layer 12 is formed as homogeneously and uniformly as possible. As it becomes less homogeneous and uniform, although being capable of emitting light, a decrease in brightness and a deterioration of life (deterioration due to ultraviolet light) become likely to occur. Furthermore, as a comparative example, a voltage was applied to a light-emitting body including the insulative particles 11 only and not including the coating layer 12 and its light-emission state was evaluated. The surface creepage occurred at the surface of the inorganic phosphor particles and the light-emission similar to the present embodiment was confirmed. However, the brightness instantly decreased, and it was difficult to emit light continuously.

From this, it was found that the coating layer 12 functioned not only to generate the surface creepage and continue the discharge but also as a protective film to suppress a deterioration due to ultraviolet light and a deterioration due to electric field of the particles 11.

Although the above-stated embodiment uses MgO as the coating layer 12, the reason for this is that a resistance value of MgO is as large as $10^9$ $\Omega \cdot cm$ or more, which allows the surface creepage to occur effectively. In the case of the resistance value below $10^9$ $\Omega \cdot cm$, the surface creepage becomes unlikely to occur, and in the worst case a short-circuit may occur, and therefore such a value is not desirable. Thus, it is desirable to use an insulative metal oxide with a resistance value of $10^9$ $\Omega \cdot cm$ or more. Herein, it is desirable not to use those having properties of shielding ultraviolet light and deliquescence/efflorescence properties. Although most of these oxides have properties of shielding ultraviolet light, such properties can be improved by making a thickness of the coating thinner. Furthermore, the insulative metal oxide constituting the coating layer 12 may be a stable substance having a considerably small standard free energy of formation of oxides $\Delta G_f^0$ (e.g., $-100$ kcal/mol or less at room temperatures) or may be a substance having a capacity of 100 or more as a dielectric constant. Thus, it is desirable that the insulative metal oxide always keeps an insulative metal oxide property that tends not to be reduced even when the surface creepage occurs, in addition to having a high insulation resistance value.

Therefore, with consideration given to these matters, it is desirable to form the coating layer 12 using at least one of $Y_2O_3$, $Li_2O$, $MgO$, $CaO$, $BaO$, $SrO$, $Al_2O_3$, $SiO_2$, $MgTiO_3$, $CaTiO_3$, $BaTiO_3$, $SrTiO_3$, $ZrO_2$, $TiO_2$, $B_2O_3$, $PbTiO_3$, $PbZrO_3$ and $PbZrTiO_3(PZT)$.

Furthermore, instead of the sol/gel method, the coating layer 12 may be formed by a chemical absorption method and a physical absorption method using a CVD method, a sputtering method, an evaporation method, a laser method, a shearing stress method and the like, from which the same effects as above can be obtained. It is important for the coating film 12 to be formed homogeneously and uniformly so as not be peeled off. Thus, it is desirable, before the formation of the coating layer 12, to immerse the inorganic phosphor particles 11 into a weak acid solution such as acetic acid, oxalic acid and citric acid so as to wash impurities attached on a surface of the inorganic phosphor particles. This is because the coating layer 12 with a uniform thickness can be formed easily on the particles 11 whose surfaces have been washed.

Moreover, it is desirable to conduct pretreatment for the particles 11 before the formation of the coating layer 12 in an atmosphere of nitrogen at 200 to 500° C. for about 1 to 5 hours. The reason for this is as follows: untreated particles 11 include a large amount of absorbed water and water of crystallization, and when the coating layer 12 is formed on the particles 11 in such a state, a deterioration of life properties such as a deterioration of brightness and a shift in emission spectrum becomes remarkable. When the particles are washed with a weak acid solution, pretreatment may be conducted after the washing.

The points to note during the heat treatment process to form the light-emitting body 13 include a temperature and an atmosphere where the heat treatment is conducted. In the above-stated embodiment, since the heat treatment is conducted in an atmosphere of nitrogen and at relatively low temperatures (450 to 1200° C.), a valence of the doped rare earth element in the particles 11 did not change. When the treatment is conducted at higher temperatures, however, the valence of the doped rare earth element in the particles 11 may change or a solid solution may form between the coating layer 12 and the particles 11, and therefore care should be taken to avoid this. As a heat treatment temperature increases, a density of the light-emitting body 13 increases, and therefore due care should be given thereto. Therefore, as the ideal heat treatment temperatures, 450 to 1200° C. are preferable. As for the heat treatment atmosphere, it is desirable to conduct the heat treatment in an atmosphere of nitrogen with consideration given to the valence of the doped rare earth element in the particles 11.

In the present embodiment, the thickness of the coating layer 12 is set at about 0.1 to 2.0 µm. However, the thickness may be determined with consideration given to an average particle diameter of the particles 11 and the efficiency of the surface creepage. Conceivably, the average particle diameter in a submicron order requires still thinner covering. A larger thickness of the coating layer 12 may result in a shift in emission spectrum, a deterioration of brightness and shielding of ultraviolet light, and therefore this is not preferable. Conversely, a smaller thickness of the coating layer 12 may result in the failure of the surface creepage. Therefore, a favorable relationship between the average particle diameter of the particles 11 and the thickness of the coating layer 12 is the latter within 1/10 to 1/500 with reference to the former assumed to be 1.

Furthermore, ideally, the light-emitting body 13 is constituted with the particles 10a that are the inorganic phosphor particle 11 as the primary particles with the coating layer 12 made of the insulative metal oxide provided thereon as shown in FIG. 2A. Generally, however, it is constituted with the light-emitting particles 10b that are the flocculated particles with the coating layer 12 provided thereon as shown in FIG. 2B. As the light-emitting element, however, there is not much difference in performance between these light-emitting particles.

Furthermore, the electrodes 14a and 14b may be formed by attaching a glass on which an ITO film has been formed. If one of the electrodes is transparent, the other one may be a metal plate such as aluminum and stainless steel.

Embodiment 2

Figure 3:
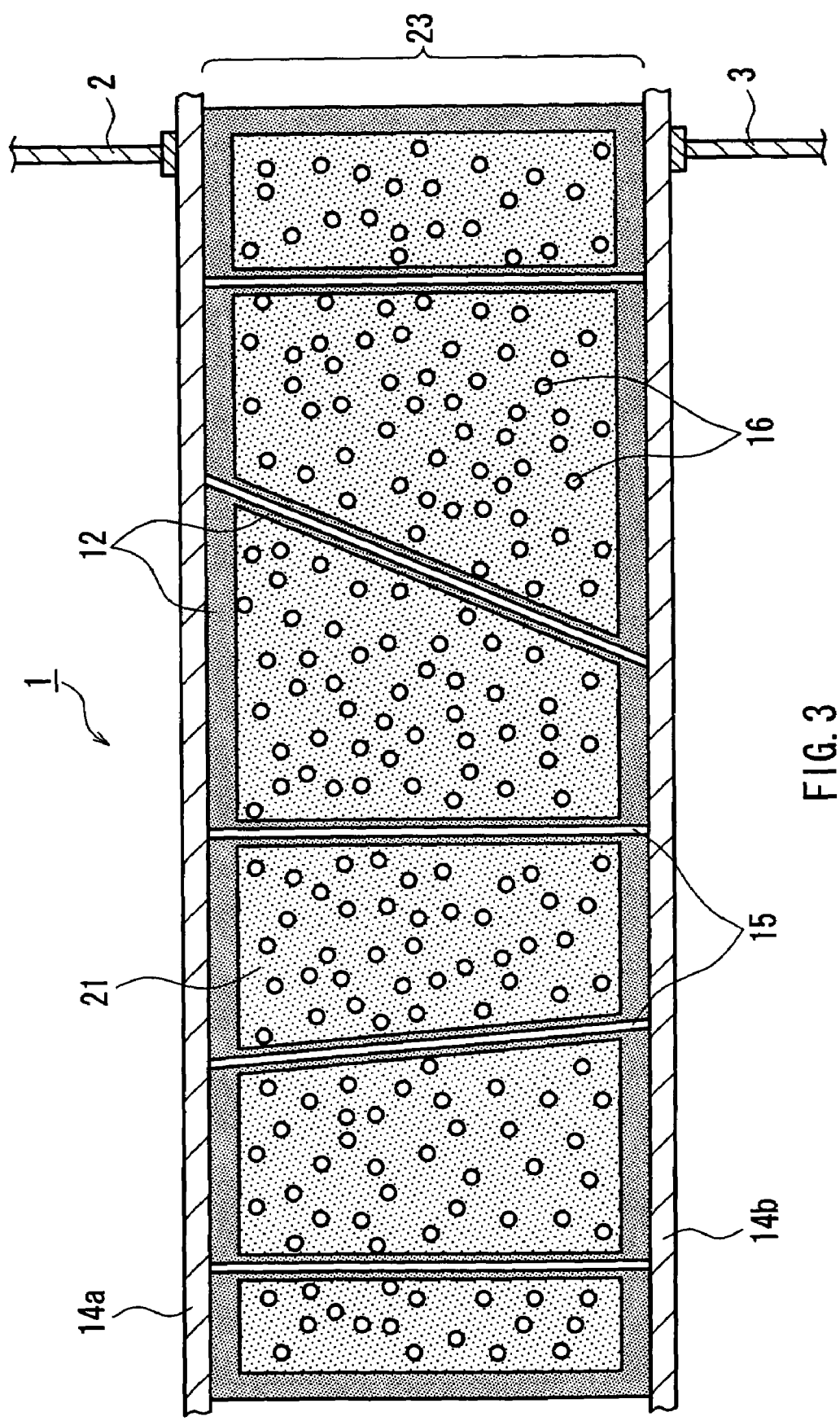
FIG. 3 is a cross-sectional view of a light-emitting element of Embodiment 2 of the present invention.

The following describes a light-emitting element 1 produced using porous inorganic phosphors, with reference to FIG. 3. FIG. 3 is a cross-sectional view of the light-emitting element 1 of Embodiment 2 of the present invention. Reference numeral 21 denotes a porous inorganic phosphor layer, 12 denotes a coating layer made of MgO that is an insulative metal oxide, 23 denotes a porous light-emitting layer made up of the phosphor layer 21, the coating layer 12 and pores 16, 14a and 14b denote ITO transparent electrodes that are provided at surfaces of the light-emitting layer 23 so as to have a predetermined gap therebetween, 1 denotes the light-emitting element and 15 denotes a through hole provided in the light-emitting layer 23.

The following describes a method for producing the light-emitting element 1 of Embodiment 2. Firstly, using the same three colored inorganic phosphor powder as in Embodiment 1, each powder was mixed with 5 wt % polyvinyl alcohol and was granulated, followed by shaping through the application of a pressure at about 50 MPa into a disk shape with a diameter of 10 mm and a thickness of 1 mm. During this step, through holes 15 each having a diameter of 50 to 500 µm were bored at several points randomly using a metal needle. Next, a heat treatment was conducted thereto in an atmosphere of nitrogen at 450 to 1200° C. for 2 to 5 hours, whereby a porous inorganic phosphor layer 21 was produced. Next, the phosphor layer 21 was immersed into a suspension, in which $Mg(OH)_2$ and ammonia water were mixed at substantially equal molar ratios, for 10 to 30 minutes, which then was dried at 150° C. This immersion and drying process was repeated several times. Thereafter, it was calcined in the air at 400 to 600° C. for 2 to 5 hours, so that a light-emitting layer 23 was produced having a coating layer 12 of MgO on a surface of the phosphor layer 21 and having a myriad of pores 16. During this step, the coating layer 12 was formed on a surface of the through hole 15 and a surface of the pores 16 as well, which was observed with a transmission electron microscope (TEM). A thickness of the coating layer 12 was 0.1 to 2.0 µm. Subsequently, electrodes 14a and 14b were formed by sputtering at upper and lower faces of the light-emitting layer 23, whereby a light-emitting element 1 was obtained.

A method for letting this light-emitting element 1 emit light will be described below. Similarly to Embodiment 1, a voltage was applied between the electrodes 14a and 14b via lead wires 2 and 3. The voltage may be alternating current or direct current. The application of the voltage causes the generation of surface creepage at the coating layer 12. The discharge occurs continuously like a chain reaction, thus emitting ultraviolet light and visible light. Then, the thus generated ultraviolet light optically pumps the phosphor layer 21, thereby emitting visible light. Once the surface creepage begins, the discharge repeats like a chain reaction so as to generate ultraviolet light and visible light, and therefore in order to suppress adverse effects of this light on the phosphor layer 23, a value of the voltage after the initiation of the light-emission preferably is reduced to 50 to 80% of that applied at the initial state. When the voltage was applied at about 0.3 to 1.0 kV/mm by means of an AC power source or a DC power source, the surface creepage occurred, followed by the initiation of light-emission. A value of the current at this time was 0.1 mA or smaller. Furthermore, once the light-emission was initiated, the light-emission continued even when the value of the voltage was reduced. High-quality light-emission was confirmed similarly to Embodiment 1 for the three colors of blue, green and red. The mechanism of the light-emission is similar to that of Embodiment 1. In order to generate the surface creepage effectively and obtain high-quality light-emission, the matters described in Embodiment 1 were executed, whereby favorable effects could be attained.

Furthermore, in the present embodiment, the through holes 15 having a diameter of 50 to 500 μm were provided in the light-emitting layer 23 so as to improve the light-emission efficiency. In connection with this, if the through holes 15 are too large in size, air discharge may occur. Therefore care should be given to this point. Ideally, even when the through holes 15 are provided, it is desirable for the light-emitting particles to make point-contact three-dimensionally with at least one adjacent light-emitting particle. Thus, in order to suppress influences of the air discharge and the mechanical strength, it is desirable to make the diameter of the through holes 15 smaller than 2 mm.

The electrodes 14a and 14b may be formed by attaching a glass on which an ITO film has been formed. If one of the electrodes is transparent, the other one may be a metal plate such as aluminum and stainless steel.

Embodiment 3

In the above Embodiment 2, the phosphor layer 21 is shaped using a pressing machine. On the other hand, in the present embodiment, a paste including light-emitting particles 10a and 10b is screen-printed so as to form a light-emitting element 1. The following describes such an embodiment, with reference to FIG. 4.

Figure 4:
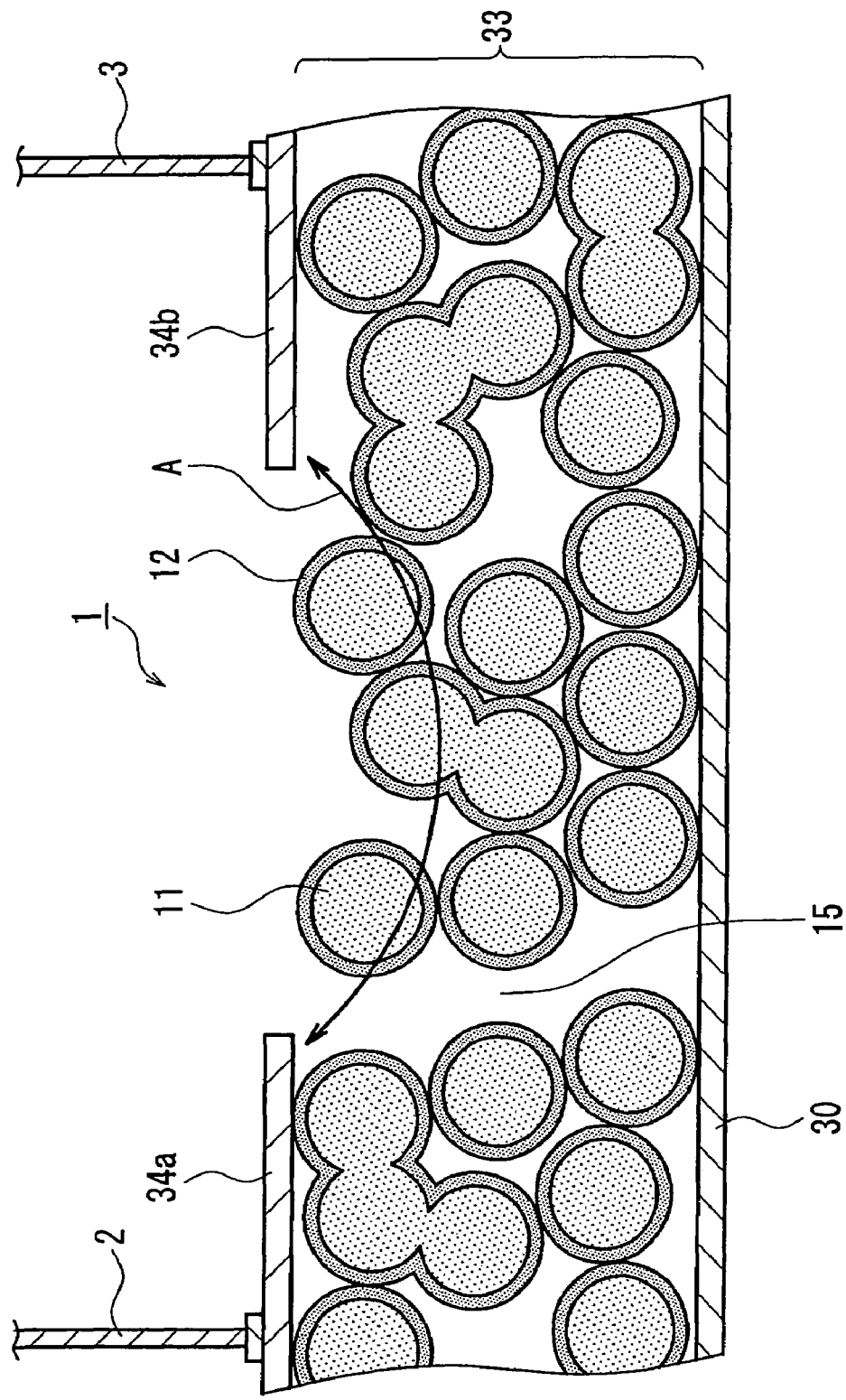
FIG. 4 is a cross-sectional view of a light-emitting element of Embodiment 3 of the present invention.

FIG. 4 is a cross-sectional view of the light-emitting element 1 of Embodiment 3. Reference numeral 30 denotes a ceramic substrate, 33 denotes a porous light-emitting body and 34a and 34b denote ITO transparent electrodes. The light-emitting body 33 is an assembly of the light-emitting particles 10a and 10b each including an inorganic phosphor particle 11 with a coating layer 12 made of MgO that is an insulative metal oxide provided thereon.

The following describes a method for producing the light-emitting element 1. Firstly, ethyl cellulose and α-terpineol were added to the light-emitting particles 10a and 10b described in Embodiment 1 so as to prepare a paste. Next, the paste was screen-printed on a ceramic substrate 30, followed by drying. This process was repeated so as to produce a thick layer of about 80 to 100 μm in printed thickness. Thereafter, a heat treatment was conducted in an atmosphere of nitrogen at 450 to 1200° C. for 2 to 5 hours, whereby a considerably porous light-emitting body 33 was produced. The thickness of the light-emitting body 33 at this step was about 50 to 80 μm. Thereafter, two ITO transparent electrodes 34a and 34b were formed by sputtering on the upper surface of the light-emitting body 33. During this step, through holes 15 having a diameter of 50 to 500 μm were provided randomly at several points using a metal needle. With this configuration, the light-emitting element 1 shown in FIG. 4 was obtained. A method for letting this light-emitting element 1 emit light will be described below. Similarly to Embodiments 1 and 2, a voltage was applied between the electrodes 34a and 34b via lead wires 2 and 3. The voltage may be alternating current or direct current. The application of the voltage causes the generation of an electric field across an arrow A. Thereby, surface creepage occurs at the coating layer 12, and the discharge occurs continuously like a chain reaction, thus emitting ultraviolet light and visible light. Then, the thus generated ultraviolet light optically pumps the particles 11, thereby emitting visible light. Once the surface creepage begins, the discharge repeats like a chain reaction so as to generate ultraviolet light and visible light, and therefore in order to suppress adverse effects of this light on the light-emitting body 33, a value of the voltage after the initiation of the light-emission preferably is reduced to 50 to 80% of that applied at the initial state. When the voltage was applied at about 0.1 to 0.8 kV/mm by means of an AC power source or a DC power source, the surface creepage occurred, followed by the initiation of light-emission. A value of the current at this time was 0.1 mA or smaller. Furthermore, once the light-emission was initiated, the light-emission continued even when the value of the voltage was reduced. High-quality light-emission was confirmed similarly to Embodiments 1 and 2 for the three colors of blue, green and red.

The mechanism of the light-emission is similar to that of Embodiment 1. In order to generate the surface creepage effectively and obtain high-quality light-emission, the matters described in Embodiments 1 and 2 were executed, whereby favorable effects could be attained.

Furthermore, according to Embodiment 3, the thickness of the light-emitting body 33 could be made thinner than Embodiments 1 and 2, and the light-emission was confirmed even when the electrodes 34a and 34b were formed on the same plane. Note here that, in the case where the electrodes 34a and 34b are formed on the same plane, a surface leakage may occur. Therefore, a distance between the electrodes 34a and 34b should be controlled. Although the distance between the electrodes 34a and 34b depends on the thickness of the light-emitting body 33 and a value of the voltage applied, at least 10 μm is required.

Herein, in Embodiment 3, available means for reducing a possibility of the surface leakage is to coat a surface of the light-emitting element 1 with $SiO_2$ and the like. In this case, the $SiO_2$ on the electrodes 34a and 34b should be removed so as to allow electrical conduction.

Although the light-emitting element 1 of Embodiment 3 has a configuration close to that of an inorganic EL, a light-emission mechanism thereof is totally different. The phosphor particles 11 of Embodiment 3 may be an insulator or a semiconductor. That is, even when a phosphor of a semiconductor is used, the light-emission can continue without the generation of short-circuit because the coating layer 12 is provided.

In Embodiment 3, the paste including the light-emitting particles 10a and 10b is screen-printed, whereby the light-emitting element 1 was formed.

The electrodes 34a and 34b may be formed by attaching a glass on which an ITO film has been formed. Furthermore, the electrodes 34a and 34b may be a metal plate such as aluminum and stainless steel instead of transparent electrodes, because the light is emitted between the electrodes 34a and 34b.

Embodiment 4

The following describes an embodiment in which a paste including phosphor powder is screen-printed so as to form a light-emitting element 1.

Figure 5:
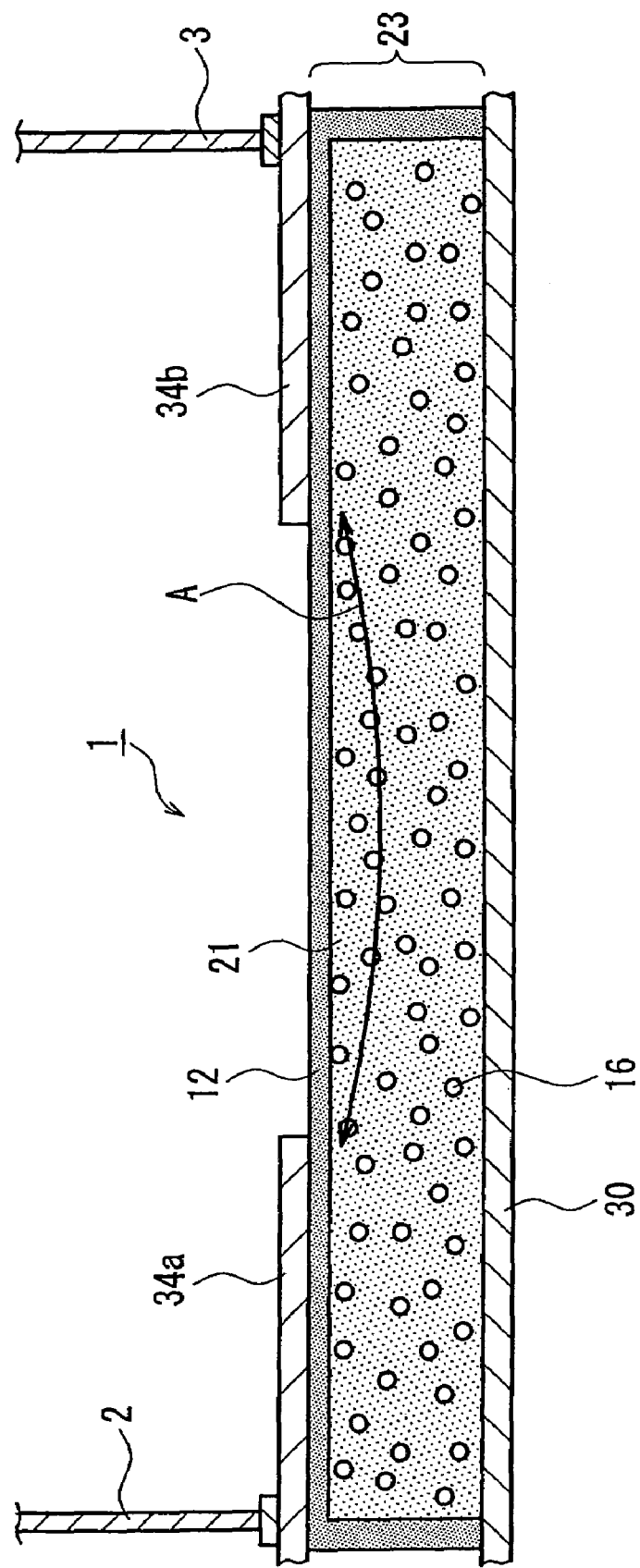
FIG. 5 is a cross-sectional view of a light-emitting element of Embodiment 4 of the present invention.

FIG. 5 is a cross-sectional view of the light-emitting element 1 of Embodiment 4 of the present invention. Reference numeral 21 denotes a porous inorganic phosphor layer, 12 denotes a coating layer made of MgO that is an insulative metal oxide, 23 denotes a porous light-emitting layer made up of the phosphor layer 21, the coating layer 12 and pores 16, 34a and 34b denote ITO transparent electrodes provided at a surface of the light-emitting layer 23 so as to have a predetermined gap therebetween, and 1 denotes the light-emitting element.

The following describes a method for producing the light-emitting element 1 of Embodiment 4. Firstly, ethyl cellulose and α-terpineol were added to three-colored inorganic phosphor powder so as to prepare a paste. Next, the phosphor layer 21 was screen-printed on a ceramic substrate 30. The thickness of the phosphor layer 21 at this process was about 20 to 25 μm.

Thereafter, a heat treatment was conducted in an atmosphere of nitrogen at 450 to 1200° C. for 2 to 5 hours, whereby a porous phosphor layer 21 having a large number of pores 16 in the layer was produced. A thickness of the phosphor layer 21 at this step was about 15 to 20 μm. Additionally, MgO was formed by sputtering at an upper layer portion of the phosphor layer 21 so as to form a coating layer 12, whereby a porous light-emitting layer 23 made up of the phosphor layer 21, the coating layer 12 and the pores 16 was formed. Thereafter, two ITO transparent electrodes 34a and 34b were formed by sputtering on the upper surface of the light-emitting layer 23. With this configuration, the light-emitting element 1 shown in FIG. 5 was obtained.

A method for letting this light-emitting element 1 emit light will be described below. Similarly to the above-stated Embodiment 3, a voltage is applied between the electrodes 34a and 34b via lead wires 2 and 3. The voltage may be alternating current or direct current. The application of the voltage causes the generation of an electric field across an arrow A. Thereby, surface creepage occurs at the coating layer 12, and the discharge occurs continuously like a chain reaction, thus emitting ultraviolet light and visible light. Then, the thus generated ultraviolet light optically pumps the phosphor layer 21, thereby emitting visible light. Once the surface creepage begins, the discharge repeats like a chain reaction so as to generate ultraviolet light and visible light, and therefore in order to suppress adverse effects of this light on the light-emitting layer 23, a value of the voltage after the initiation of the light-emission preferably is reduced to 50 to 80% of that applied at the initial state. When the voltage was applied at about 0.05 to 0.8 kV/mm by means of an AC power source or a DC power source, the surface creepage occurred, followed by the initiation of light-emission. A value of the current at this time was 0.1 mA or smaller. Furthermore, once the light-emission was initiated, the light-emission continued even when the value of the voltage was reduced. High-quality light-emission was confirmed similarly to Embodiments 1 to 3 for the three colors of blue, green and red.

The mechanism of the light-emission is similar to that of Embodiment 2. In order to generate the surface creepage effectively and obtain high-quality light-emission, the matters described in Embodiments 1 and 2 were executed, whereby favorable effects could be attained.

Furthermore, according to Embodiment 4, the thickness of the light-emitting layer 23 could be made relatively thinner than the above Embodiment 2, and the light-emission was confirmed even when the electrodes 34a and 34b were formed on the same plane. Note here that, in the case where the electrodes 34a and 34b are formed on the same plane, a surface leakage may occur. Therefore, a distance between the electrodes 34a and 34b should be controlled. Although the distance between the electrodes 34a and 34b depends on the thickness of the light-emitting layer 23 and a value of the voltage applied, at least 10 μm is required.

Herein, in Embodiment 4, available means for reducing the possibility of the surface leakage include coating a surface of the light-emitting element 1 with $SiO_2$ and the like. In this case, the $SiO_2$ on the electrodes 34a and 34b should be removed so as to allow electrical conduction.

Although the light-emitting element 1 of Embodiment 4 has a configuration close to that of an inorganic EL, a light-emission mechanism thereof is totally different. The phosphor layer 21 of Embodiment 4 may be an insulator or a semiconductor. That is, even when a phosphor of a semiconductor is used, the light-emission can continue without the generation of short-circuit because the coating layer 12 is provided.

Furthermore, in Embodiment 4, it was confirmed that the provision of a through hole 15 enabled light-emission at a lower voltage and even at the inside of the phosphor layer 21. In the case where the thickness of the phosphor layer 21 was made thinner than 20 μm, it was confirmed that the light could be emitted sufficiently even at the inside of the phosphor layer 21 even in the absence of the through hole 15.

Moreover, since the MgO coating layer 12 formed by sputtering tends to be an amorphous form, it is desirable to make this crystallized by conducting a heat treatment in an air or an atmosphere of nitrogen at 450 to 1200° C. for 2 to 5 hours.

The electrodes 34a and 34b may be formed by attaching a glass on which an ITO film has been formed. Furthermore, the electrodes 34a and 34b may be a metal plate such as aluminum and stainless steel instead of transparent electrodes, because the light is emitted between the electrodes 34a and 34b.

Embodiment 5

Figure 6:
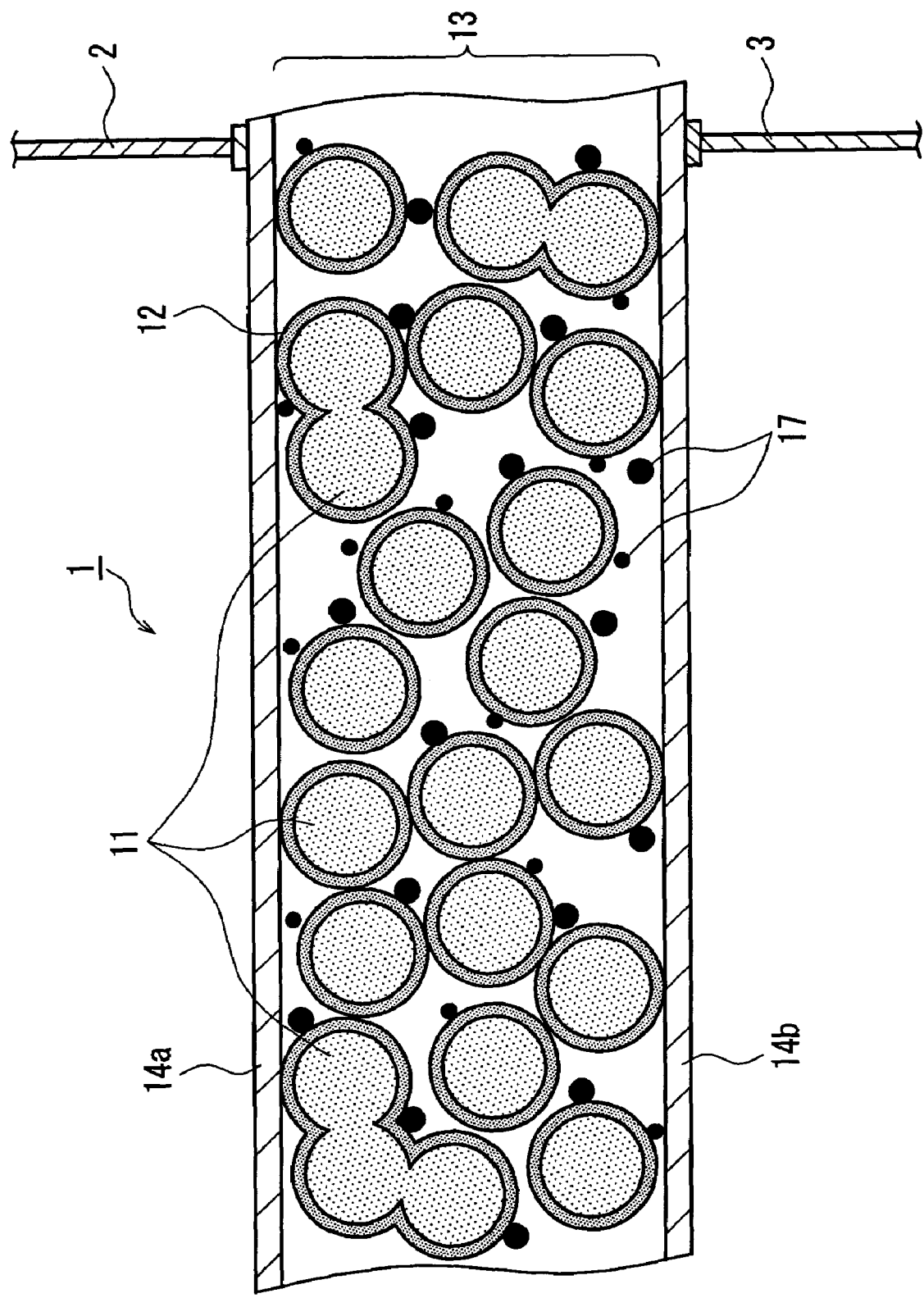
FIG. 6 is a cross-sectional view of a light-emitting element of Embodiment 5 of the present invention.

FIG. 6 is a cross-sectional view of a light-emitting element 1 according to Embodiment 5 of the present invention. Reference numeral 11 denotes an inorganic phosphor particle that is a primary particle or a flocculated secondary particle, 12 denotes a coating layer made of MgO that is an insulative metal oxide, 13 denotes a porous light-emitting body made up of light-emitting particles 10a and 10b, 14a and 14b denote ITO transparent electrodes that are provided at surfaces of the light-emitting body 13 so as to have a predetermined gap therebetween, 17 denotes a substance with low resistance and 1 denotes the light-emitting element.

The following describes a method for producing the light-emitting element 1 of Embodiment 5. Firstly, the light-emitting powder as produced in Embodiment 1 (10a [primary particle], 10b[secondary particle]) (10 to 100 vol ratio), fine-grained metal powder (0.1 to 0.5 μm) that contained at least one type among Pd, Pt, Ag, Ni, Cu and Zn (1 vol ratio) and 5 wt % polyvinyl alcohol were mixed and granulized, followed by shaping through the application of a pressure at about 50 MPa into a disk shape with a diameter of 10 mm and a thickness of 1 mm. Next, a heat treatment was conducted thereto in an atmosphere of nitrogen or a reducing atmosphere at 450 to 1200° C. for 2 to 5 hours, whereby a porous light-emitting body 13 was produced. Subsequently, ITO transparent electrodes 14a and 14b were formed by sputtering at upper and lower faces of the light-emitting body 13, whereby a light-emitting element 1 was obtained. Lead wires 2 and 3 were connected thereto. Herein, the metal powder used in this step was Pd. Although the light-emitting method was exactly the same as in Embodiment 1, a difference was in that the a value of the light-emission initiation voltage was decreased to about 0.1 to 0.8 kV/mm. Although there is a difference depending on the resistance value and the amount of the metal powder dispersed, it was confirmed that surface creepage occurred at a lower voltage and high-quality light-emission was obtained similar to Embodiment 1, and therefore practicality could be improved further.

Note here that the light-emission mechanism is the same as in Embodiment 1.

Herein, in Embodiment 5, care should be taken for the control of the heat treatment temperature, its atmosphere and the particle diameter of the metal powder so as to prevent the metal powder 17 from generating a solid solution with the light-emitting particles 10a and 10b during the heat treatment process.

The reasons for selecting the above metal powder are as follows: that is, Pd, Pt and Ag are metal materials that are resistant to oxidizing and are capable of holding low resistance values. Ni and Cu are metal materials that are susceptible to oxidizing, but they are capable of holding a low resistance value during a heat treatment in the atmosphere and are at low cost. Furthermore, Zn assumes semiconductor properties even when it is oxidized and is capable of holding a relatively low resistance value. Since these metal materials have different melting points and some of them have melting points at 1000° C. or lower, care should be taken for the heat treatment temperature. The particle diameter of the metal powder is 0.1 to 0.5 μm, which is finer than the light-emitting body.

The electrodes 14a and 14b may be formed by attaching a glass on which an ITO film has been formed. If one of the electrodes is transparent, the other one may be a metal plate such as aluminum and stainless steel.

Furthermore, instead of the metal powder, a low-resistant substance having flowability may be dispersed, whereby the similar effects can be obtained. This will be explained in Embodiment 6.

Embodiment 6

When the light-emitting element 1 produced in Embodiment 2 was impregnated with pure water, a weak acid solution such as oxalic acid, acetic acid, boric acid and citric acid or a conductive high polymer such as polyacetylene for 10 to 30 minutes and the solution on a surface of the light-emitting element 1 was removed, followed by the application of a voltage, then the light-emission was initiated at a voltage value of about 0.1 to 0.5 kV/mm. Surface creepage occurred at a lower voltage and it was confirmed that high-quality light-emission was obtained similar to Embodiment 1.

In this step, if the conductive high polymer is dispersed in a matrix form, a short-circuit phenomenon occurs or the surface creepage becomes unlikely to occur. Therefore, in the case of the pure water and the weak acid solution being employed, drying at 50 to 80° C. for 5 to 10 minutes is required and in the case of the conductive high polymer, dilution with alcohol is required after the impregnation.

However, the sample of Embodiment 5 tends to dry by letting it stand in the air or due to the heat generation during the surface creepage. Therefore, it is desirable to coat the light-emitting element 1 with $SiO_2$ or the like as shown in Embodiment 3 or to conduct vacuum encapsulation. In this case, the $SiO_2$ on the electrodes 14a and 14b was removed so as to allow electrical conduction.

According to Embodiment 6, since the surface and the inside of the light-emission body are impregnated with the conductive high polymer, there is a possibility that a short-circuit phenomenon occurs at the initial stage of the application of the voltage. However, in a while, the light-emitting body generates heat and surface creepage occurs together with the evaporation of moisture contents.

Embodiment 7

The following describes Embodiment 7 that is directed to a light-emitting element of the present invention and a display device using the same, with reference to the drawings.

Figure 7:
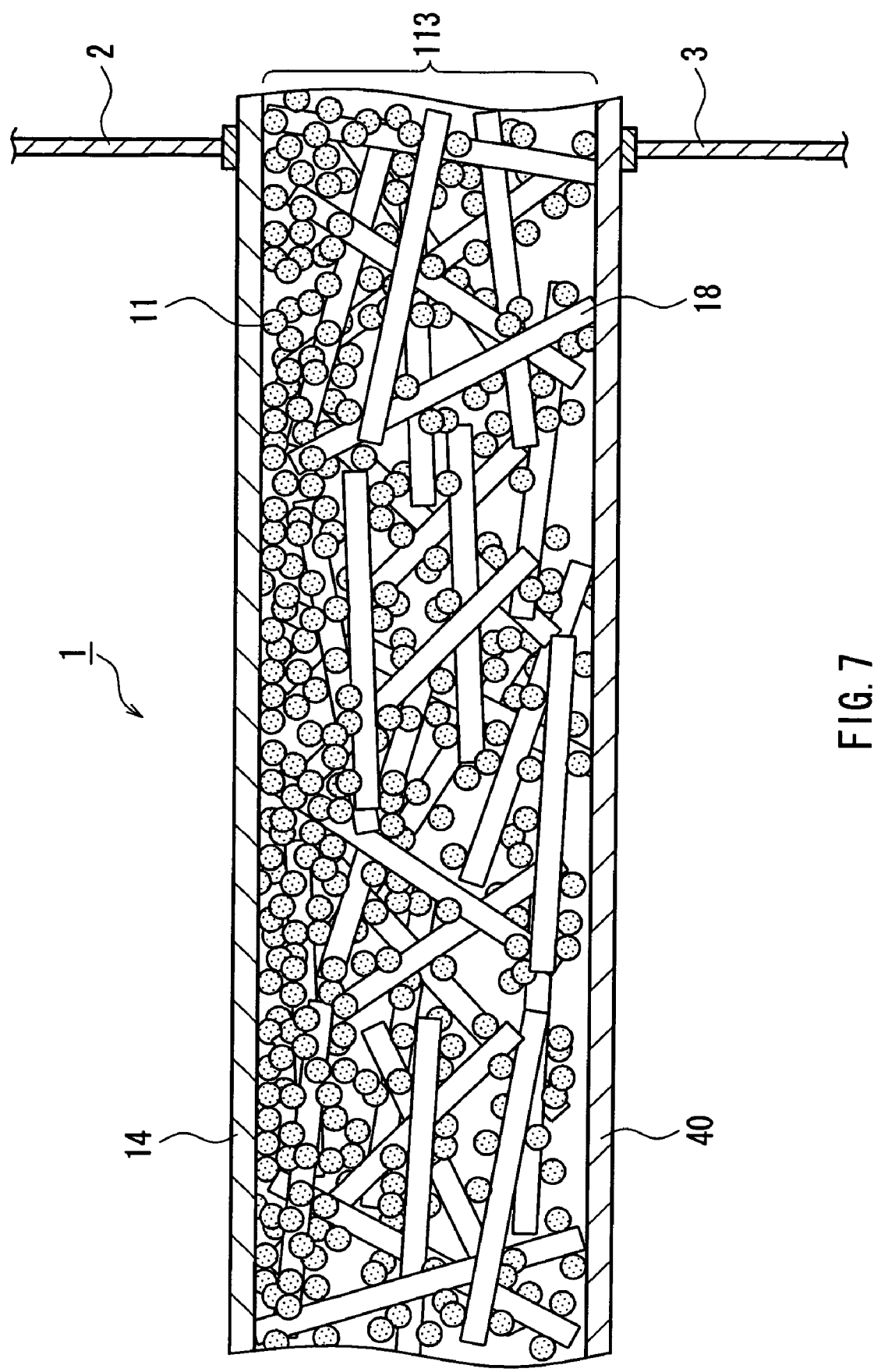
FIG. 7 is a cross-sectional view of a light-emitting element of Embodiment 7 of the present invention.

FIG. 7 is a cross-sectional view of a light-emitting element 1 of Embodiment 7 of the present invention, where reference numeral 11 denotes an inorganic phosphor particle, 18 denotes a $SiO_2$—$Al_2O_3$—$CaO$ based insulative fiber, 113 denotes a porous light-emitting body made up of the particle 11 and the insulative fiber 18, 14 denotes an ITO transparent electrode and 40 denotes a metal substrate.

The following describes a method for producing the light-emitting element 1 of Embodiment 7. As the inorganic phosphor particles 11, three types of particles including $BaMgAl_{10}O_{17}:Eu^{2+}$ (blue:B), $Zn_2SiO_4:Mn^{2+}$ (green:G) and $Y_2O_3:Eu^{3+}$ (red:R) were used, where the average particle diameter was 2 to 3 μm. For 100 g of each powder, 45 g of butyl acetate, 10 g of BBP (butyl benzyl phthalate), 33.3 g of α-terpineol, 10 g of thinner and 15 g of binder (butyral resin) were mixed so as to prepare three types of pastes. Next, these pastes were screen-printed on a sheet-form sintered-body board made of $SiO_2$—$Al_2O_3$—$CaO$ based insulative fibers 18, the board measuring 60 mm in length, 25 mm in width and about 0.7 mm in thickness, where the pastes were separately applied like a lateral stripe in the order of R, G and B. The width of the stripe was 100 to 200 μm. The average particle diameter of the particles in this step was about 3 μm, and fibers with a diameter of about 10 to 20 μm and a length of 50 to 100 μm and fibers with a length of about 200 to 500 μm were tangled in the board. Since a porosity (void ratio) of the board is 50 to 90%, solvent of the printed paste immediately is absorbed into the inside. The particles 11 also enter into the board because the particle diameter is fine. The board assumes a clogged state gradually, and the particles 11 that are prevented from entering are piled up onto the surface of the board, thus resulting in the state shown in FIG. 7. That is, the particles 11 are present densely on one surface of the board.

If the diameter of the insulative fiber 18 is 20 μm or more and the length of the same becomes larger than 100 μm, the surface of the board becomes coarse, so that it becomes difficult to apply the particles 11 uniformly. Therefore, the preferable fiber diameter and the fiber length are 20 μm or less and 100 μm or less, respectively.

Herein the insulative fiber may include a needle-like particle, a whisker and moreover particles formed by crushing long fibers.

Next, this was dried in the air at 100 to 150° C., followed by a heat treatment conducted in the air or in an atmosphere of nitrogen at 450 to 1200° C. for 0.25 to 10 hours, whereby a light-emitting body 113 was produced.

Thereafter, as a test specimen for confirming discharge, an indium tin oxide alloy (ITO) transparent electrode 14 was formed on an upper surface of the light-emitting body 113 and a metal substrate 40 was connected to a lower surface of the light-emitting body 113, whereby a light-emitting element 1 was obtained. During this step, a contact property between the light-emitting body 113 and the electrodes 14 and 40 was enhanced by using a colloidal silica aqueous solution or a colloidal alumina aqueous solution as an adhesive and drying it at 100 to 200° C. As for the metal substrate 40, it was confirmed that the same effects could be obtained by baking an electrode paste to be attached. The lifetime was longer in the case using the colloidal silica aqueous solution. The reason for this can be considered that the phosphor particles are coated with colloidal particles, where the colloidal particles function as a coating layer.

A method for letting this light-emitting element 1 emit light will be described below. Firstly, a voltage was applied between the electrodes 14 and 40 via lead wires 2 and 3. The voltage may be alternating current or direct current. The application of the voltage causes the generation of discharge at a surface of the insulative fibers 18. The discharge occurs continuously like a chain reaction, thus emitting ultraviolet light and visible light. Then, the thus generated ultraviolet light optically pumps the particles 11, thereby emitting visible light.

Once the discharge begins, the discharge repeats like a chain reaction so as to generate ultraviolet light and visible light, and therefore in order to suppress adverse effects of this light on the light-emitting body 113, a value of the voltage preferably is reduced after the initiation of the light-emission.

When the voltage was applied at about 0.3 to 1.0 kV/mm by means of an AC power source or a DC power source, the discharge occurred, followed by the initiation of light-emission. A value of the current at this time was 0.1 mA or smaller. Furthermore, once the light-emission was initiated, the light-emission continued even when the value of the voltage was reduced to 50 to 80% of that applied at the initial state. It was confirmed that the light-emitting element 1 had a high brightness, a high contrast, a high recognition capability and a high reliability for all of the three colors: blue; green; and red.

Although the light-emitting element 1 of Embodiment 7 has a configuration close to that of an inorganic EL, the light-emission mechanism thereof is totally different. More specifically, the light (ultraviolet light) generated through the discharge by the application of the voltage pumps the inorganic phosphor particle 11, thus enabling light-emission (photoluminescence). On the other hand, the light-emission principle of the inorganic EL is as described in the section of BACKGROUND ART.

Furthermore, this light-emitting element 1 does not require vacuum encapsulation and a high voltage value that are required for the glow discharge, and is expected to be a light-emitting element having a high brightness, a high contrast, a high recognition capability and a high reliability in the air. Therefore, as compared with the organic EL and the inorganic EL, this light-emitting element can have a simple configuration and can be produced easily, which means that it does not require the use of higher level of thin-film technology.

In addition, it was found that efficient discharge significantly depended on the porosity of the board made of the insulative fibers 18. That is, the discharge is unlikely to occur in a dense board with a small porosity, and even when the discharge occurs, the light-emission occurs at the surface only, which results in a low light-emission efficiency. That is, in order to emit light effectively, the light-emitting body 113 needs to have a configuration that allows the particles 11 to enter into the inside of the board. By making the light-emitting body 113 porous as in Embodiment 7, the discharge occurs not only at the surface of the light-emitting body 113 but also at the inside thereof, so that the inorganic phosphor particles 11 emit light efficiently.

Furthermore, it was found that plural insulative fibers 18 constituting the light-emitting body 113 overlapped so as to be a network configuration, which became an important factor for the generation of the discharge.

Conversely, if the porosity of the board increases, smoothness of the board surface is degraded, or a mechanical strength thereof becomes weak and brittle. Therefore, the preferable porosity of the board is 50 to 90%.

Furthermore, the reasons for selecting $SiO_2$—$Al_2O_3$—CaO based fibers as the insulative fibers 18 are as follows: these fibers are thermally and chemically stable and have a resistance value of $10^9$ Ω·cm or more, and can have a configuration that enables a large porosity of 50 to 90%. Therefore, the discharge occurs at a surface of each fiber, resulting in the discharge generated at the board as a whole. When the board is too dense, the discharge occurs only at the surface or at the end portion thereof. Note here that the use of a sintered-body board containing SiC, ZnO, $TiO_2$, MgO, BN or $Si_3N_4$ based fiber can produce the similar effects.

Additionally, another important point is the heat treatment condition. The heat treatment temperature and its atmosphere should be controlled depending on the composition of the fibers so as to prevent the fibers and the inorganic phosphor particles 11 from reacting with each other and generating a solid solution therebetween during the heat treatment process. In the present embodiment, the heat treatment was conducted in the air or in the atmosphere of nitrogen for 0.25 to 10 hours, where the temperature was set at a minimum temperature that allows the removal of the organic substances contained in the particles 11, i.e., at 450 to 1200° C. If a large amount of organic substances is contained within the light-emitting body 113, the deterioration of the light-emission properties and the life property becomes remarkable, and therefore care should be taken to avoid this. However, if the organic binder is not used, there is no need to conduct the above-stated heat treatment. For instance, the board of the insulative fibers 18 is immersed in a slurry in which a colloidal silica aqueous solution is mixed with the phosphor particles 11, which is then dried in the air at 100 to 200° C., whereby a porous light-emitting body 113 can be formed.

Figure 16A:
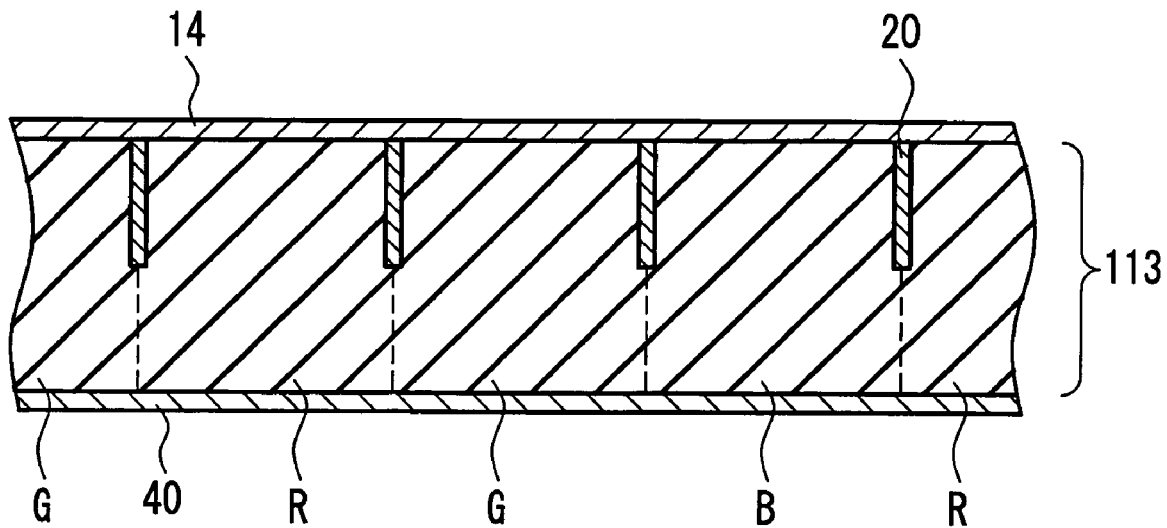
FIG. 16A is a cross-sectional view of the light-emitting element of Embodiment 7 of the present invention, which has a light-shielding film formed from a surface side of the light-emitting body toward the inside thereof.

In the above-stated embodiment, a light-shielding film or a groove may be provided between the respective colored inorganic phosphor regions of R, G and B. For instance, as shown in FIG. 16A, a light-shielding film 20 extending from a surface side toward the inside may be formed. The light-shielding film can be formed by coating with a black paste so that the paste coating can be absorbed through the surface of the light-emitting body 113. A preferable width of the light-shielding film 20 is 25 to 50 µm and a preferable depth of the same is 10 µm or more.

Figure 16B:
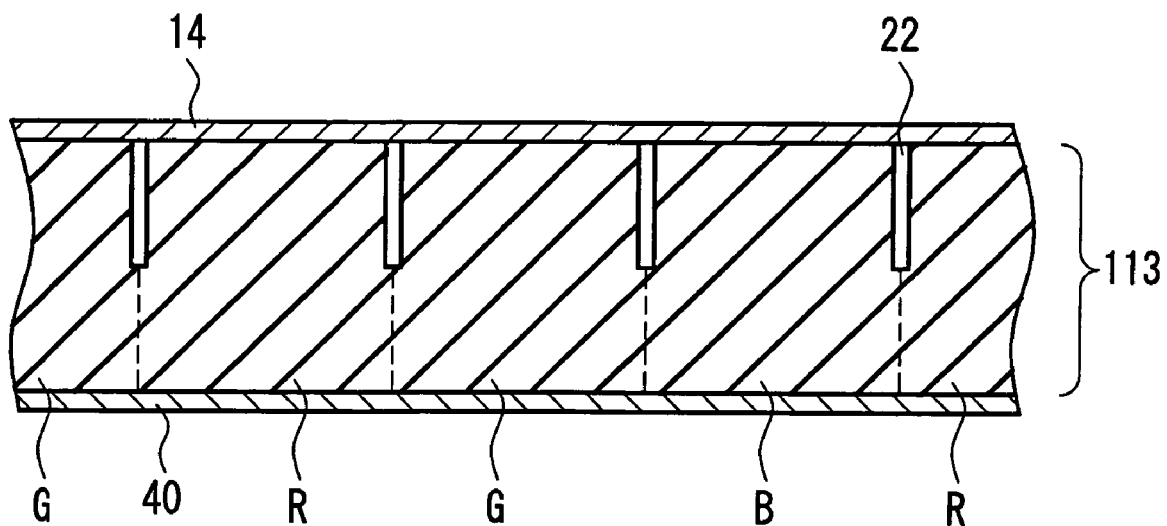
FIG. 16B is a cross-sectional view of the light-emitting element having a groove.

Furthermore, as shown in FIG. 16B, a groove 21 may be formed. By providing the light-shielding film or the groove, the mixture of the colors of light emitted from the respective phosphors can be prevented, thus enabling a sharp full-colored display. A preferable width of the groove 22 is 25 to 50 µm and a preferable depth of the same is 10 µm or more.

Embodiment 8

Figure 8:
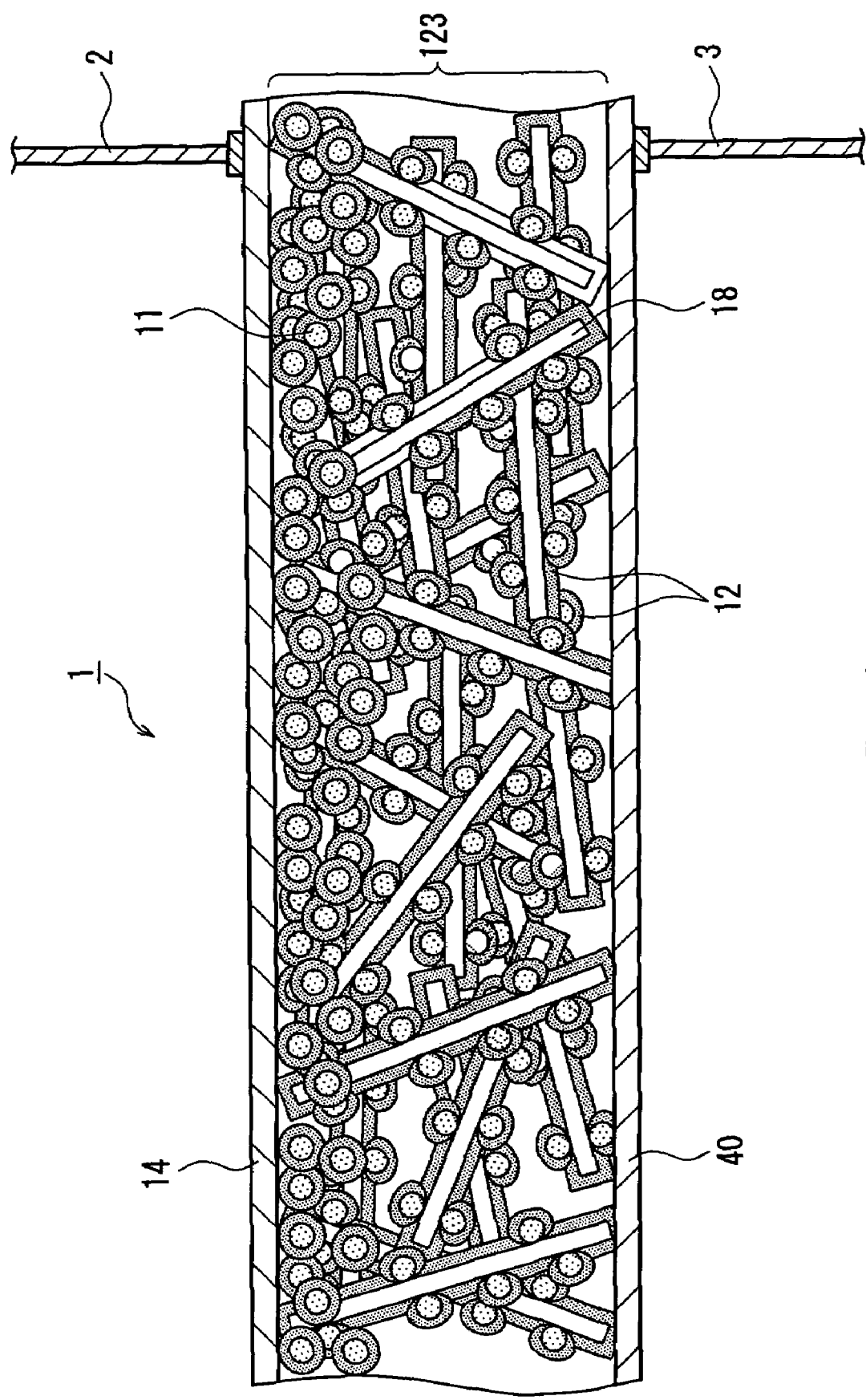
FIG. 8 is a cross-sectional view of a light-emitting element of Embodiment 8 of the present invention.

Referring now to FIG. 8, an embodiment in which a surface of an inorganic phosphor particle is coated with an insulative inorganic substance will be described below.

FIG. 8 is a cross-sectional view of a light-emitting element 1 of Embodiment 8 of the present invention, where reference numeral 11 denotes an inorganic phosphor particle, 12 denotes a coating layer, 18 denotes a $SiO_2$—$Al_2O_3$—CaO based insulative fiber, 123 denotes a porous light-emitting body made up of the particle 11 and the fiber 18, 14 denotes an ITO transparent electrode, 40 denotes a metal substrate and 1 denotes the light-emitting element.

The following describes a method for producing the light-emitting element 1 of Embodiment 8. Firstly, a paste was prepared using the same three-colored inorganic phosphor powder as in Embodiment 7. Next, the paste was screen-printed on a sheet-form sintered-body board made of the $SiO_2$—$Al_2O_3$—CaO based insulative fibers 18 that measured about 0.7 mm in thickness.

Next, this was dried in the air at 100 to 150° C., followed by a heat treatment conducted in the air or in an atmosphere of nitrogen at 450 to 1200° C. for 0.25 to 10 hours. Next, this was immersed in a tetraethylorthosilicate (TEOS) solution (containing ethanol as a solvent, and concentration of 50 to 100%) at room temperature, which was dried, followed by a heat treatment in the air or in an atmosphere of nitrogen at 450 to 1200° C. for 0.25 to 1 hour, whereby a porous light-emitting body 123 was produced in which the coating layer 12 was formed on a surface of the inorganic phosphor particles 11 and the insulative fibers 18. Subsequently, an ITO transparent electrode 14 and a metal substrate 40 were connected on upper and lower surfaces of the light-emitting body 123, respectively, whereby a light-emitting element 1 was obtained. During this step, a contact property between the light-emitting body 123 and the electrodes 14 and 40 was enhanced by using a colloidal silica aqueous solution or a colloidal alumina aqueous solution as an adhesive and drying it at 100 to 200° C. As for the metal substrate 40, it was confirmed that the same effects could be obtained by baking an electrode paste to be attached.

A method for letting this light-emitting element 1 emit light will be described below. Similarly to Embodiment 7, a voltage was applied between the electrodes 14 and 40 via lead wires 2 and 3. The voltage may be alternating current or direct current. The application of the voltage causes the generation of discharge at a surface of the coating layer 12. The discharge occurs continuously like a chain reaction, thus emitting ultraviolet light and visible light. Then, the thus generated ultraviolet light optically pumps the particles 11, thereby emitting visible light. Once the discharge begins, the discharge repeats like a chain reaction so as to generate ultraviolet light and visible light, and therefore in order to suppress adverse effects of this light on the light-emitting body 123, a value of the voltage preferably is reduced after the initiation of the light-emission. When the voltage was applied at about 0.3 to 1.0 kV/mm by means of an AC power source or a DC power source, the discharge occurred, followed by the initiation of light-emission. A value of the current at this time was 0.1 mA or smaller. Furthermore, once the light-emission was initiated, the light-emission continued even when the value of the voltage was reduced. It was confirmed that the high-quality light was emitted for three colors of blue, green and red similar to Embodiment 7.

The mechanism of the light-emission is similar to that of Embodiment 7. In order to generate the discharge effectively and obtain high-quality light-emission, the matters described in Embodiment 7 were executed, whereby favorable effects could be attained.

The coating layer 12 was formed as homogeneously and uniformly as possible. As it becomes less homogeneous and uniform, although being capable of emitting light, a decrease in brightness and a deterioration of life (deterioration due to ultraviolet light) become likely to occur. The purpose of the coating layer 12 is to protect the particles 11 from the deterioration due to ultraviolet light and the deterioration due to water contents as well as to emit light effectively. As the discharge occurs, the light-emission efficiency becomes better. Although a thickness of the coating layer 12 is set at 0.05 to 2.0 μm in the present embodiment, this may be determined with consideration given to the average particle diameter of the particles 11 and a fiber diameter of the insulative fibers 18.

A larger thickness of the coating layer 12 may result in a shift in emission spectrum, a deterioration of brightness and shielding of ultraviolet light, and therefore this is not preferable. Therefore, a favorable relationship between the average particle diameter of the particles 11 and the thickness of the coating layer 12 is the latter within 1/10 to 1/500 with reference to the former assumed to be 1.

In the present embodiment, $SiO_2$ is used as the coating layer 12. The reason for this is that $SiO_2$ has a favorable film-formation property and effects for preventing the deterioration due to ultraviolet light and the deterioration due to water contents of the particles 11, which is the main purpose thereof.

In addition to the above-described effects, there are other effects of having a resistance value of $10^9$ Ω·cm or more and allowing the discharge to occur effectively. In the case of the resistance value below $10^9$ Ω·cm, the discharge becomes unlikely to occur, and in the worst case, short-circuit may occur, and therefore such a value is not desirable. Thus, it is desirable to form the coating layer 12 using an insulative metal oxide with a resistance value of $10^9$ Ω·cm or more. Herein, it is desirable not to use those having properties of shielding ultraviolet light and water-absorption/deliquescence/efflorescence properties. Although most of the insulative metal oxides have properties of shielding ultraviolet light, such properties can be improved by making the thickness of the coating thinner.

Furthermore, the insulative metal oxide constituting the coating layer 12 may be a stable substance having a considerably small standard free energy of formation of oxide $\Delta G_f^0$ (e.g., −100 kcal/mol or less at room temperatures) or may be a substance having a capacity of 100 or more as a dielectric constant. Thus, it is desirable that the insulative metal oxide always keeps an insulative metal oxide property that tends not to be reduced even when the discharge occurs, in addition to having a high insulation resistance value.

Therefore, with consideration given to these matters, it is desirable to form the coating layer 12 using at least one of $Y_2O_3$, $Li_2O$, MgO, CaO, BaO, SrO, $Al_2O_3$, $SiO_2$, $MgTiO_3$, $CaTiO_3$, $BaTiO_3$, $SrTiO_3$, $ZrO_2$, $TiO_2$, $B_2O_3$, $PbTiO_3$, $PbZrO_3$ and $PbZrTiO_3$ (PZT).

Furthermore, instead of the sol/gel method, the coating layer 12 may be formed by a chemical absorption method, a physical absorption method such as a CVD method, a sputtering method, an evaporation method, a laser method, a shearing stress method and the like, from which the same effects as above can be obtained. It is important for the coating film 12 to be formed as homogeneously and uniformly as possible so as not be peeled off. Thus, it is desirable to, before the formation of the coating layer 12, immerse the light-emitting body 123 into a weak acid solution such as acetic acid, oxalic acid and citric acid so as to wash impurities attached on a surface of the light-emitting body. This is because the coating layer 12 with a uniform thickness can be formed easily on the light-emitting body 123 whose surfaces have been washed.

The points to note during the two heat treatment processes to form the light-emitting body 123 include a temperature and an atmosphere where the heat treatment is conducted. In the present embodiment, since the heat treatment is conducted in the air or in an atmosphere of nitrogen and at relatively low temperatures, a valence of the doped rare earth element in the inorganic phosphor particles 11 did not change. When the treatment is conducted at higher temperatures, however, the valence of the doped rare earth element may change or a solid solution may form between the coating layer 12 and the particles 11, and therefore care should be taken to avoid this.

Therefore, care should be taken so as not to change the valence of the rare earth element due to the heat treatment.

Furthermore, the phosphors used in Embodiment 8 may be a semiconductor or an insulator. Although the phosphor used in the inorganic EL is a semiconductor light-emitting body typified by $ZnS:Mn^{2+}$ and GaP:N, the particles 11 used in Embodiment 8 may be an insulator or a semiconductor. That is, even when a phosphor particle of a semiconductor is used, the light-emission can continue without the generation of short-circuit because the particles are covered with the coating layer 12 made of the insulative metal oxide uniformly. As in Embodiment 7, the immersion in a colloidal silica aqueous solution, followed by drying in the air at 100 to 200° C. results in the formation of the coating layer 12 on the surface of the inorganic phosphor particles 11 and the insulative fibers 18. It was confirmed that the use of this coating layer 12 could produce the similar effects as well.

Embodiment 9

In Embodiments 7 and 8, an inorganic phosphor paste is applied to a sheet-form sintered-body board made of insulative fibers and a heat treatment is conducted thereto, whereby a porous light-emitting body can be produced. The following describes a method for producing a light-emitting body from a mixed powder of insulative fibers and inorganic phosphors.

Figure 9:
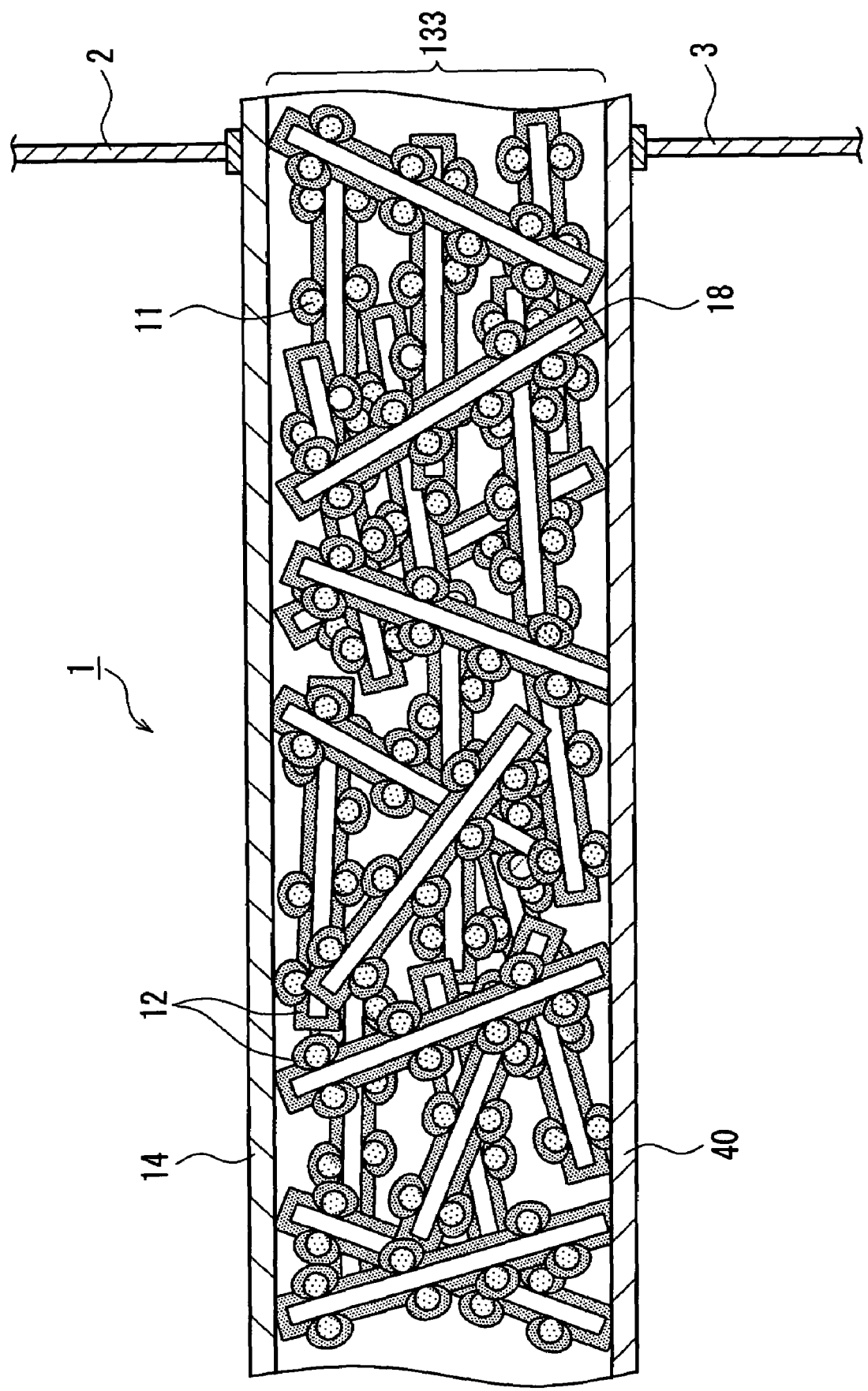
FIG. 9 is a cross-sectional view of a light-emitting element of Embodiment 9 of the present invention.

Referring now to FIG. 9, a light-emitting element 1 that is produced using a paste in which inorganic phosphor particles 11 and insulative fibers 18 are mixed will be described below. FIG. 9 is a cross-sectional view of a light-emitting element 1 of Embodiment 9 of the present invention, where reference numeral 11 denotes an inorganic phosphor particle, 12 denotes a coating layer, 18 denotes a $SiO_2$—$Al_2O_3$—$CaO$ based insulative fiber, 133 denotes a porous light-emitting body made up of the particle 11 and the insulative fiber 18, 14 denotes an ITO transparent electrode, 40 denotes a metal substrate and 1 denotes the light-emitting element.

The following describes a method for producing the light-emitting element 1 of Embodiment 9. Firstly, using the same three-colored inorganic phosphor powder as in Embodiments 7 and 8, 1/10 to 10 weight percentage of fiber powder was mixed with the inorganic phosphor powder assuming as 1, whereby mixture powder was prepared. Next, ethyl cellulose and an organic solution such as a-terpineol or butyl acetate were added thereto and pastes were produced using a kneader such as a three-roll type. The fibers 18 used in this step had a diameter of about 1 to 2 μm and a length of about 25 to 50 μm. Next, the above pastes were screen-printed on a Pt metal substrate 40, which was dried in the air at 100 to 150° C., followed by a heat treatment conducted in the air or in an atmosphere of nitrogen at 450 to 1200° C. for 0.25 to 10 hours, whereby a porous light-emitting body 133 made up of the particles 11 and the insulative fibers 18 was obtained. In this step, the application thickness after the heat treatment was 10 to 500 μm. Herein, smoothness of the printed surface becomes worse by mixing with the insulative fibers 18. Thus, preferably, the inorganic phosphor powder and the insulative fibers 18 are mixed and crushed with a ball mill and the like beforehand and then a paste is produced so as to enhance the smoothness. Next, this was immersed in a tetraethylorthosilicate (TEOS) solution, which was dried, followed by a heat treatment in the air at 450 to 1200° C. for 0.25 to 10 hours, whereby a light-emitting body 133 was produced in which the $SiO_2$ coating layer 12 was formed on a surface of the inorganic phosphor particles 11 and the insulative fibers 18. Subsequently, an ITO transparent electrode 14 was connected on an upper surface of the light-emitting body 133, whereby a light-emitting element 1 was obtained. During this step, a contact property between the light-emitting body 133 and the electrode 14 was enhanced by using a colloidal silica aqueous solution or a colloidal alumina aqueous solution as an adhesive and drying it at 100 to 200° C.

A method for letting this light-emitting element 1 emit light will be described below. Similarly to Embodiments 7 and 8, a voltage was applied between the electrodes 14 and 40 via lead wires 2 and 3. The voltage may be alternating current or direct current. The application of the voltage causes the generation of discharge at a surface of the coating layer 12. The discharge occurs continuously like a chain reaction, thus emitting ultraviolet light and visible light.

Then, the thus generated ultraviolet light optically pumps the particles 11, thereby emitting visible light. Once the discharge begins, the discharge repeats like a chain reaction so as to generate ultraviolet light and visible light, and therefore in order to suppress adverse effects of this light on the light-emitting body 133, a value of the voltage after the initiation of the light-emission preferably is reduced to 50 to 80% at the initial state. When the voltage was applied at about 0.3 to 1.0 kV/mm by means of an AC power source or a DC power source, the discharge occurred, followed by the initiation of light-emission. A value of the current at this time was 0.1 mA or smaller. Furthermore, once the light-emission was initiated, the light-emission continued even when the value of the voltage was reduced. It was confirmed that the high-quality light was emitted for three colors of blue, green and red similar to Embodiments 7 and 8.

The mechanism of the light-emission is similar to that of Embodiments 7 and 8. In order to generate the discharge effectively and obtain high-quality light-emission, the matters described in Embodiments 7 and 8 were executed, whereby favorable effects could be attained.

Furthermore, in the present embodiment, the light-emitting body 133 is formed using a paste of a mixture of the particles 11 and the insulative fibers 18, and therefore a concentration gradient in a depth direction of the particles 11 can be suppressed as compared with Embodiments 7 and 8, and the light-emitting body 133 could emit light uniformly as a whole.

Moreover, as for the mixture ratio of the particles 11 with the insulative fibers 18, as the amount of the former powder increases, the configuration becomes dense and the discharge becomes unlikely to occur. Conversely, as the amount of the latter powder increases, it has a porous configuration but the brightness thereof tends to deteriorate. Therefore, the mixture ratio should be the insulative fibers 18 being 1/10 to 10 with reference to the particles 11 in terms of weight percentage, which is preferably 1/5 to 5.

Furthermore, the insulative fibers 18 allow the discharge to be generated in a network form. Therefore, the insulative fibers 18 should be as fine as possible with consideration given to the configuration of the light-emitting body 133 and the light-emission intensity. Although the $SiO_2$—$Al_2O_3$—$CaO$ based fibers that were used as the currently available on the market had a diameter of about 1 to 2 μm and a length of about 25 to 50 μm, the length of the fibers can be short by mechanically crushing (about 5 μm) for the use. In the case of the fibers becoming too short, however, it becomes difficult to form a network, which results in difficulty in the generation of the discharge. Therefore, preferably, the diameter of the fibers is made up to about 0.5 μm and the length of the fibers is made up to about 3 μm.

Furthermore, although the application thickness of the light-emitting body 133 is 10 to 500 μm after the heat treatment, screen-printing requires at least 5 μm of application thickness because, in the case of the thickness being too small, a short-circuit may occur during the application of a voltage. The optimum application thickness was 10 to 100 μm. However, when the film is formed by evaporation, sputtering, a CVD method and the like, the thickness can be made smaller.

The coating layer 12 is formed as homogeneously and uniformly as possible. As it becomes less homogeneous and uniform, although being capable of emitting light, a decrease in brightness and a deterioration of life (deterioration due to ultraviolet light) become likely to occur. The purpose of this coating layer 12 is to protect the particles 11 from the deterioration due to ultraviolet light and the deterioration due to water contents as well as to emit light effectively. As the discharge occurs, the light-emission efficiency is improved remarkably. Although a thickness of the coating layer 12 is set at about 0.05 to 2.0 μm in the present embodiment, this may be determined with a consideration given to the average particle diameter of the particles 11 and a fiber diameter of the insulative fibers 18. A larger thickness of the coating layer 12 may result in a shift in emission spectrum, a deterioration of brightness and shielding of ultraviolet light, and therefore this is not preferable. Therefore, a favorable relationship between the average particle diameter of the particles 11 and the thickness of the coating layer 12 is the latter within 1/10 to 1/500 with reference to the former assumed to be 1.

As in the above-stated embodiment, the coating layer 12 can be formed on the surface of the inorganic phosphor particles 11 and the insulative fibers 18 by the immersion in a colloidal silica aqueous solution instead of a TEOS solution, which is dried in the air at 100 to 200° C. It was confirmed that the similar effects could be obtained from this coating layer 12 also.

In Embodiment 9, the coating layer 12 is formed. However, even in the absence of the coating layer 12, the light-emitting body 133 can emit light because the fibers tangling like a network facilitate the discharge. However, the deterioration due to discharge and the deterioration due to ultraviolet light could be suppressed well when the coating layer 12 was formed.

In Embodiment 9, the light-emitting body 133 was applied at an upper layer portion of the Pt metal substrate 40 and a heat treatment was conducted thereto. However, the light-emitting body 133 may be applied on a PET film, for instance, the PET film may be peeled off and a heat treatment may be conducted, and then a metal substrate 40 may be attached thereto. Herein, as an adhesive for this step, a colloidal silica aqueous solution or a colloidal alumina aqueous solution was used, which was dried at 100 to 200° C., whereby a contact strength could be increased. The metal substrate 40 used in this step may be noble metals other than Pt or base metals.

Embodiment 10

Figure 10:
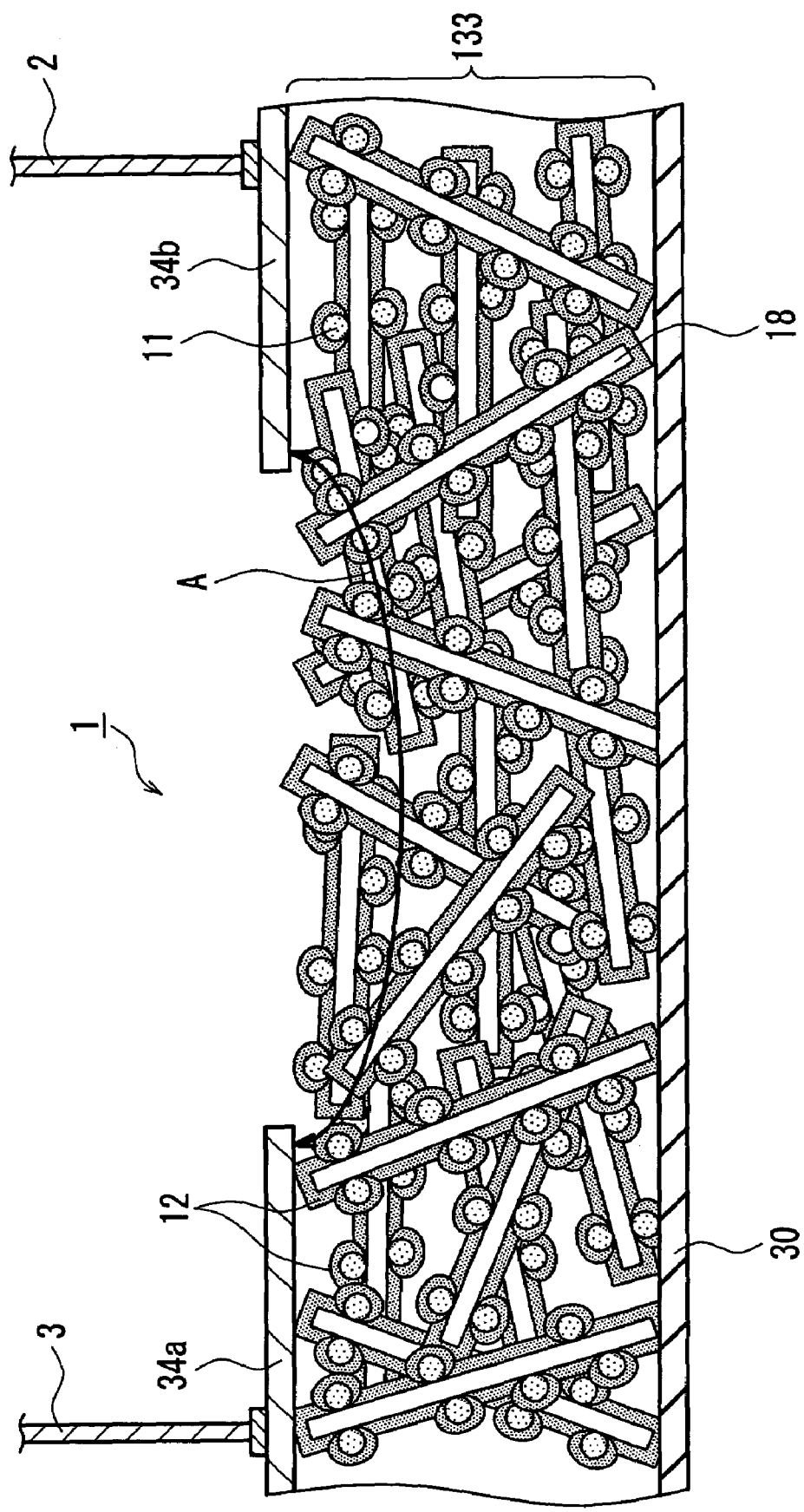
FIG. 10 is a cross-sectional view of a light-emitting element of Embodiment 10 of the present invention.

The following describes an embodiment in which electrodes are formed on the same plane, with reference to FIG. 10.

FIG. 10 is a cross-sectional view of a light-emitting element 1 of Embodiment 10 of the present invention, where reference numeral 11 denotes an inorganic phosphor particle, 12 denotes a coating layer, 18 denotes a $SiO_2$—$Al_2O_3$—$CaO$ based insulative fiber, 133 denotes a porous light-emitting body made up of the coated particle 11 and the coated insulative fiber 18, 34a and 34b denote ITO transparent electrodes that are provided on a surface of the light-emitting body 133, 30 denotes a substrate made of ceramic, glass, metal or the like and 1 denotes the light-emitting element.

The following describes a method for producing the light-emitting element 1 of Embodiment 10. Firstly, the same pastes as in Embodiment 9 were used. Next, the above pastes were screen-printed on the substrate 30, which was dried in the air at 100 to 150° C., followed by a heat treatment conducted in the air or in an atmosphere of nitrogen at 450 to 1200° C. for 0.25 to 10 hours, whereby a porous light-emitting body 133 made up of the inorganic phosphor particles 11 and the insulative fibers 18 was obtained. In this step, the application thickness after the heat treatment was 10 to 500 μm. Next, this was immersed in a magnesium complex solution, which was dried, followed by a heat treatment in the air at 450 to 600° C. for 0.25 to 1 hour, whereby a light-emitting body 133 was produced in which the MgO coating layer 12 was formed on a surface of the particles 11 and the fibers 18. The reason for using the complex solution in this step is that the complex solution facilitates the formation of a uniform and thin coating layer 12 as compared with a sol/gel solution. Subsequently, ITO transparent electrodes 34a and 34b were formed by sputtering on an upper surface of the light-emitting body 133, whereby a light-emitting element 1 was obtained.

The electrodes 34a and 34b may be formed by attaching a glass on which an ITO film has been formed. Furthermore, the electrodes 34a and 34b may be a metal plate such as aluminum and stainless steel instead of transparent electrodes, because the light is emitted between the electrodes 34a and 34b.

A method for letting this light-emitting element 1 emit light will be described below. A voltage was applied between the electrodes 34a and 34b via lead wires 2 and 3. The voltage may be alternating current or direct current. In this step, an electric field is generated between the electrodes 34a and 34b (an arrow A). The application of the voltage causes the generation of the discharge at a surface of the coating layer 12, and the discharge occurs continuously like a chain reaction, thus emitting ultraviolet light and visible light. Then, the thus generated ultraviolet light optically pumps the inorganic phosphor particles 11, thereby emitting visible light. Once the discharge begins, the discharge repeats like a chain reaction so as to generate ultraviolet light and visible light, and therefore in order to suppress adverse effects of this light on the light-emitting body 133, a value of the voltage after the initiation of the light-emission preferably is reduced to 50 to 80% of that applied at the initial state. When the voltage was applied at about 0.3 to 1.0 kV/mm by means of an AC power source or a DC power source, the discharge occurred, followed by the initiation of light-emission. A value of the current at this time was 0.1 mA or smaller. Furthermore, once the light-emission was initiated, the light-emission continued even when the value of the voltage was reduced. High-quality light-emission was confirmed similarly to Embodiments 7 to 9 for the three colors of blue, green and red. The mechanism of the light-emission is similar to that of Embodiments 7 to 9. In order to generate the discharge effectively and obtain high-quality light-emission, the matters described in Embodiments 7 to 9 were executed, whereby favorable effects could be attained.

The effects and the purposes of the coating layer 12 are as described in Embodiments 8 and 9.

In Embodiment 10, the light-emitting body 133 is formed using a paste of a mixture of the inorganic phosphor particles 11 and the insulative fibers 18 containing a $SiO_2$—$Al_2O_3$—$CaO$ based substance as a main component, and therefore a concentration gradient in a depth direction of the particles 11 can be suppressed as compared with Embodiments 7 and 8, and the light-emitting body 133 could emit light uniformly as a whole.

Moreover, as for the mixture of the particles 11 with the fibers 18, as the amount of the former powder increases, the configuration becomes dense and the discharge becomes unlikely to occur. Conversely, as the amount of the latter powder increases, it has a porous configuration but brightness thereof tends to deteriorate. Therefore, the mixture ratio should be the fibers 18 being 1/10 to 10 with reference to the particles 11 in terms of weight percentage, which is preferably in a range of 1/5 to 5.

Furthermore, according to Embodiment 10, the thickness of the light-emitting body 133 could be made thinner than Embodiment 9, and the light-emission was confirmed even when the electrodes 34a and 34b were formed on the same plane.

Note here that, in the case where the electrodes 34a and 34b are formed on the same plane, surface leakage may occur. Therefore, a distance between the electrodes 34a and 34b should be controlled. Although the distance between the electrodes 34a and 34b depends on the thickness of the light-emitting body 133 and a value of the voltage applied, at least 10 to 1000 μm is required, and a preferable thickness is 50 to 500 μm.

Herein, in Embodiment 10, available means for reducing the possibility of the surface leakage include providing the coating layer 12 on a surface of the light-emitting element 1. In this case, the coating layer 12 on the electrodes 34a and 34b should be removed so as to allow electrical conduction.

As in the above-stated embodiment, the coating layer 12 can be formed on the surface of the inorganic phosphor particles 11 and the insulative fibers 18 by the immersion in a colloidal silica aqueous solution instead of a magnesium complex solution, which is dried in the air at 100 to 200° C. It was confirmed that the similar effects could be obtained from this coating layer 12 also.

In Embodiment 10, the coating layer 12 is formed. However, even in the absence of the coating layer 12, the light-emitting body 133 could emit light because the fibers tangling like a network facilitated the discharge. However, the deterioration due to discharge and the deterioration due to ultraviolet light could be suppressed well when the coating layer 12 was formed.

In Embodiment 10, the light-emitting body 133 was applied at an upper layer portion of the substrate 30 and a heat treatment was conducted thereto. However, the light-emitting body 133 may be applied on a PET film, for instance, the PET film may be peeled off and a heat treatment may be conducted, and then a substrate 30 may be attached thereto. Herein, as an adhesive for this step, a colloidal silica aqueous solution or a colloidal alumina aqueous solution was used, which was dried at 100 to 200° C., whereby a contact strength could be increased.

Embodiment 11

In Embodiments 8 to 10, the coating layer 12 is attached to both of the inorganic phosphors 11 and the insulative fibers 18. The following describes an embodiment in which the coating layer 12 is attached only to the particles 11, with reference to FIG. 11.

Figure 11:
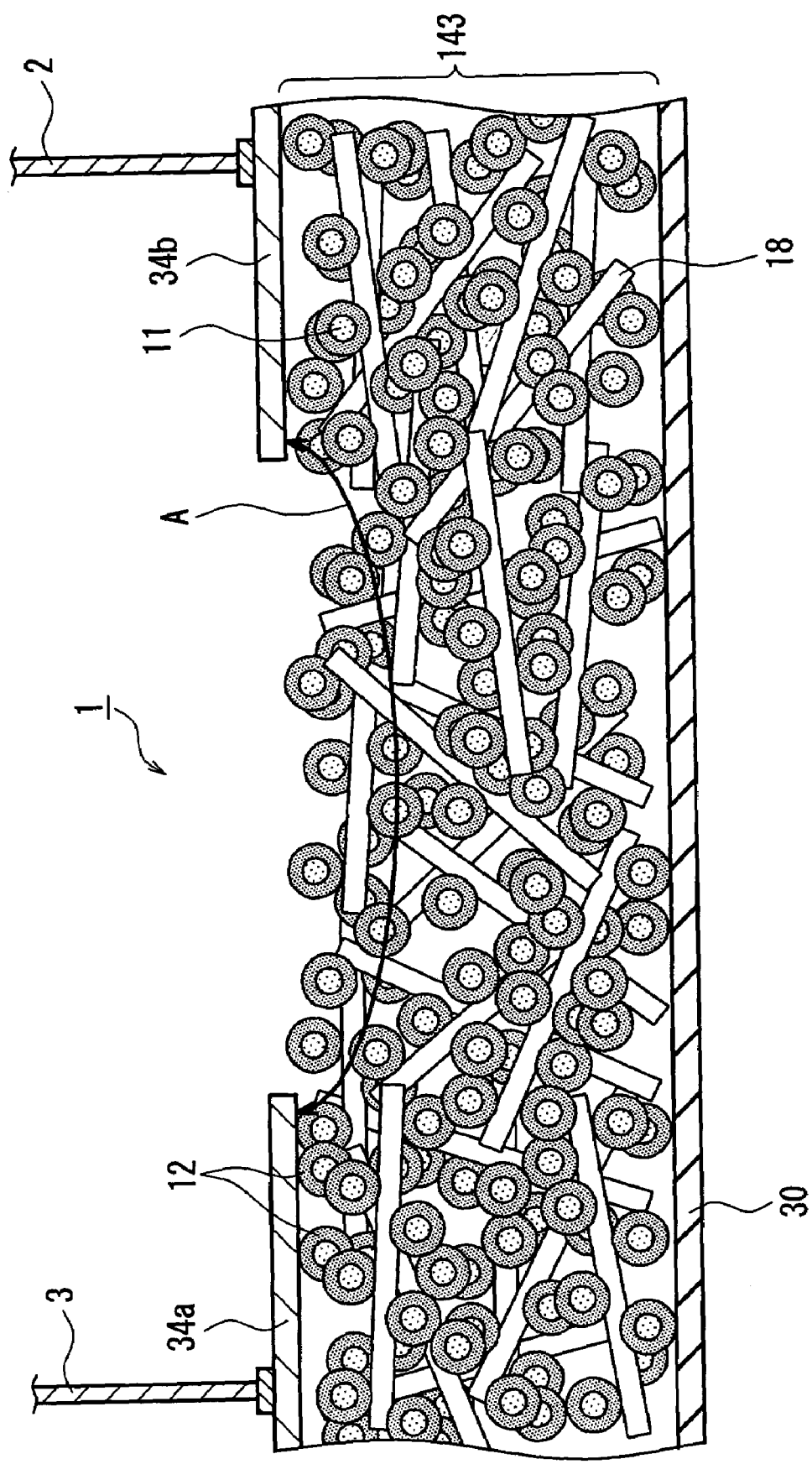
FIG. 11 is a cross-sectional view of a light-emitting element of Embodiment 11 of the present invention.

FIG. 11 is a cross-sectional view of a light-emitting element 1 of Embodiment 11 of the present invention, where reference numeral 11 denotes an inorganic phosphor particle, 18 denotes an insulative fiber containing a $SiO_2$—$Al_2O_3$—$CaO$ based substance as a main component, 143 denotes a porous light-emitting body made up of the particle 11 and the fiber 18, 34a and 34b denote ITO transparent electrodes that are provided on a surface of the light-emitting body 143, 30 denotes a substrate made of ceramic, glass, metal or the like and 1 denotes the light-emitting element.

The following describes a method for producing the light-emitting element 1 of Embodiment 11. Firstly, three-colored inorganic phosphor particles 11 each was immersed in a magnesium complex solution, which was dried, followed by a heat treatment conducted in the air at 450 to 600° C. for 0.25 to 1 hour. The resulting product was crushed, whereby a MgO coating layer 12 was formed on a surface of the inorganic phosphor particles 11. Next, with respect to the particles 11 provided with the coating layer 12, 1/10 to 10 weight percentage of insulative fibers 18 were mixed, whereby a mixture powder was prepared. Furthermore, an organic solution such as α-terpineol or butyl acetate was added thereto and pastes were produced using a kneader such as a three-roll type. The fibers 18 used in this step had a diameter of about 1 to 2 μm and a length of about 25 to 50 μm. Next, the above pastes were screen-printed on a substrate 30, which was dried in the air at 100 to 150° C., followed by a heat treatment conducted in the air or in an atmosphere of nitrogen at 450 to 1200° C. for 0.25 to 10 hours, whereby a porous light-emitting body 143 made up of the particles 11 provided with the coating layer 12 and the insulative fibers 18 was obtained. In this step, the application thickness after the heat treatment was 10 to 500 μm. Subsequently, ITO transparent electrodes 34a and 34b were connected on an upper surface of the light-emitting body 143, whereby a light-emitting element 1 was obtained. The electrodes 34a and 34b may be a metal plate such as aluminum and stainless steel instead of transparent electrodes, because the light is emitted between the electrodes 34a and 34b.

A method for letting this light-emitting element 1 emit light will be described below. Similarly to Embodiment 10, a voltage was applied between the electrodes 34a and 34b via lead wires 2 and 3. The voltage may be alternating current or direct current. In this step, an electric field is generated between the electrodes 34a and 34b (an arrow A). The application of the voltage causes the generation of the discharge at a surface of the coating layer 12, and the discharge occurs continuously like a chain reaction, thus emitting ultraviolet light and visible light.

Then, the thus generated ultraviolet light optically pumps the particles 11, thereby emitting visible light. Once the discharge begins, the discharge repeats like a chain reaction so as to generate ultraviolet light and visible light, and therefore in order to suppress adverse effects of this light on the light-emitting body 143, a value of the voltage after the initiation of the light-emission preferably is reduced to 50 to 80% of that applied at the initial state. When the voltage was applied at about 0.3 to 1.0 kV/mm by means of an AC power source or a DC power source, the discharge occurred, followed by the initiation of light-emission. A value of the current at this time was 0.1 mA or smaller. Furthermore, once the light-emission was initiated, the light-emission continued even when the value of the voltage was reduced. High-quality light-emission was confirmed similarly to Embodiments 7 to 10 for the three colors of blue, green and red.

The mechanism of the light-emission is similar to that of Embodiments 7 to 10. In order to generate the discharge effectively and obtain high-quality light-emission, the matters described in Embodiments 7 to 10 were executed, whereby favorable effects could be attained.

The effects and the purposes of the coating layer 12 are as described in Embodiments 8 to 10.

In the present embodiment, the light-emitting body 143 is formed using a paste of a mixture of the particles 11 and the fibers 18, and therefore a concentration gradient in a depth direction of the particles 11 can be suppressed as compared with Embodiments 7 and 8, and the light-emitting body 143 could emit light uniformly as a whole.

Moreover, as for the mixture of the particles 11 with the fibers 18, as the amount of the former powder increases, the configuration becomes dense and the discharge becomes unlikely to occur. Conversely, as the amount of the latter powder increases, it has a porous configuration but brightness thereof tends to deteriorate. Therefore, the mixture ratio should be the fibers 18 being 1/10 to 10 with reference to the particles 11 in terms of weight percentage, which is preferably in a range of 1/5 to 5.

Furthermore, according to Embodiment 11, the thickness of the light-emitting body 143 could be made thinner than Embodiment 9, and the light-emission was confirmed even when the electrodes 34a and 34b were formed on the same plane. Note here that, in the case where the electrodes 34a and 34b are formed on the same plane, a surface leakage may occur. Therefore, a distance between the electrodes 34a and 34b should be controlled. Although the distance between the electrodes 34a and 34b depends on the thickness of the light-emitting body 143 and a value of the voltage applied, at least 10 to 1000 μm is required, and a preferable thickness is 50 to 500 μm.

In Embodiment 11, the light-emission was initiated at a slightly smaller voltage value than Embodiment 10. The reason for this can be considered that the coating layer 12 with a large resistance value is not provided on the insulative fibers 18.

Furthermore, another display utilizing an electroluminescent (EL) phenomenon also has been proposed. In an inorganic EL, light is emitted by recombination of an electron of an inorganic phosphor with a hole or the use of an exciton, which is caused by a voltage applied through electrodes arranged at an inorganic phosphor made of semiconductor, or light is emitted when an atom or an ion serving as a luminescence center that is excited by a collision with of an accelerated electron in a semiconductor returns to the original state (Refer to "Optical Property Handbook", Shigeo SHIONOYA et al., published by Asakura shoten (1984), pp 523-531 and "Physics of Light-Emission", Hiroshi KOBAYASHI, published by Asakura Shoten (2000) pp 10 to 11). However, the inorganic EL has not been used widely yet because of reasons such as the difficulty of upsizing and a high process cost due to the use of a thin-film process. Although an organic dispersion EL also is proposed, it has the drawbacks of the difficulty in realizing full-color and an insufficient life property. Therefore, this also has not been used widely.

The coating layer 12 may be formed by the immersion of the inorganic phosphor particles 11 in a colloidal silica aqueous solution instead of a magnesium complex solution, which is dried in the air at 100 to 200° C. and is crushed. It was confirmed that this resulted in the formation of the coating layer 12 having the similar effects.

Embodiment 12

In Embodiment 11, the light-emitting element is produced using as a base the inorganic phosphor powder or powder in which powder (fibers) is mixed with inorganic phosphor powder. In Embodiment 12, a light-emitting element 1 produced by using a paste to which a foaming agent further is added will be described, with reference to FIG. 12.

Figure 12:
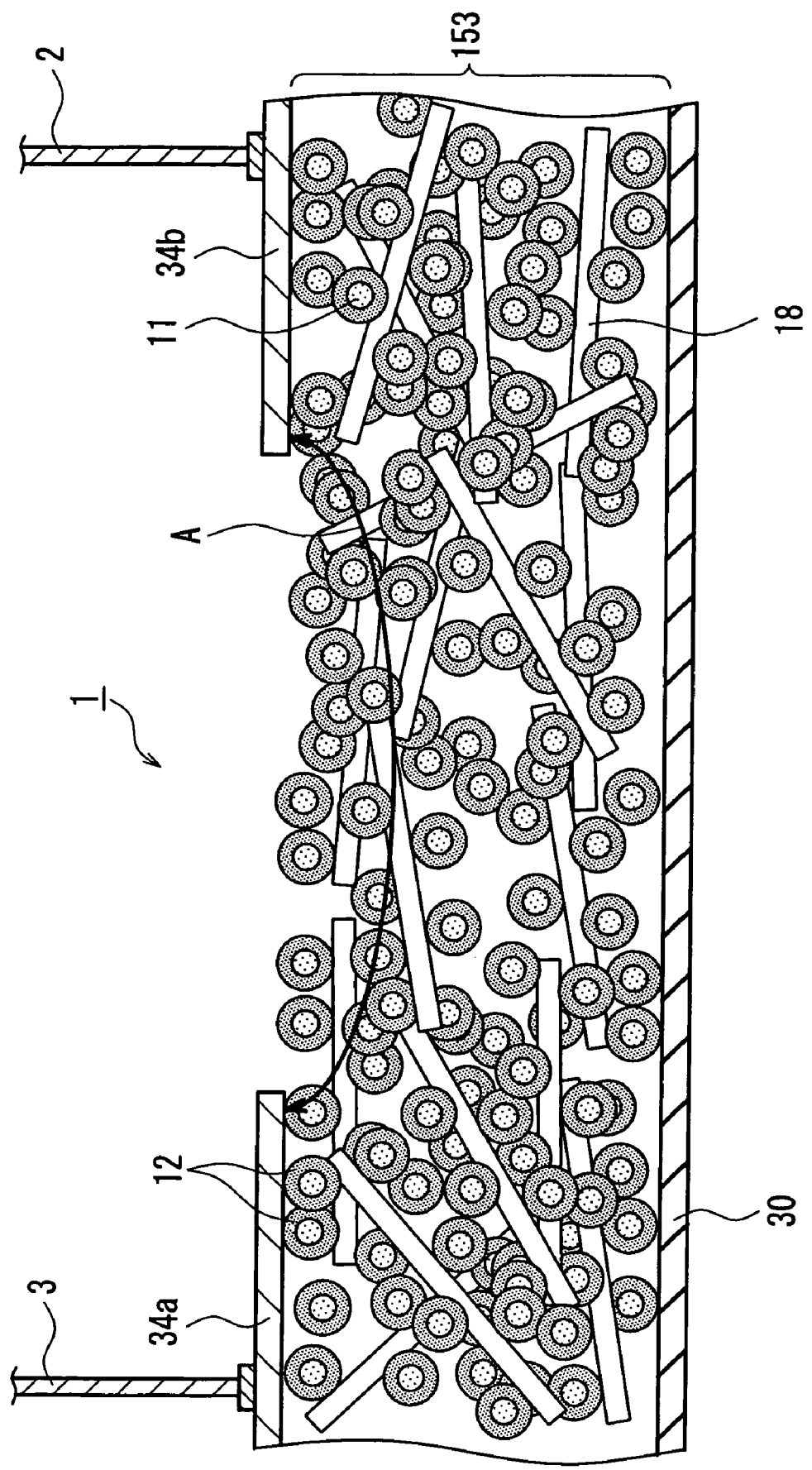
FIG. 12 is a cross-sectional view of a light-emitting element of Embodiment 12 of the present invention.

FIG. 12 is a cross-sectional view of a light-emitting element 1 of Embodiment 12 of the present invention, where reference numeral 11 denotes an inorganic phosphor particle, 18 denotes an insulative fiber containing a $SiO_2$—$Al_2O_3$—CaO based substance as a main component, 153 denotes a porous light-emitting body made up of the particle 11 and the fiber 18, 34a and 34b denote ITO transparent electrodes that are provided on a surface of the light-emitting body 153, 30 denotes a substrate made of ceramic, glass, metal or the like and 1 denotes the light-emitting element.

The following describes a method for producing the light-emitting element 1 of Embodiment 12. Firstly, a 1 to 25 wt % of pyrolytic chemical foaming agent was added and mixed to the pastes used in Embodiment 11. The chemical foaming agent used in this step was an organic pyrolytic foaming agent such as an azo compound group, a nitroso compound group and a hydrazine compound group or an inorganic pyrolytic foaming agent such as a bicarbonate group and a carbonate group. The average particle diameter of the foaming agent in this step was 5 to 10 μm. Next, the pastes were screen-printed on a substrate 30, which was dried in the air at 50 to 250° C. so as to let the pastes foam. Thereafter, a heat treatment was conducted in the air or in an atmosphere of nitrogen at 450 to 1200° C. for 0.25 to 10 hours, whereby a porous light-emitting body 153 made up of the particles 11 provided with the coating layer 12 and the fibers 18 was obtained. The application thickness after the heat treatment was 20 to 1000 μm. In order to suppress the deformation of the light-emitting body 153 due to abrupt thermal expansion of the foaming agent, the drying process was conducted slowly from a room temperature. When chemical foaming agents increase in temperature at 150 to 250° C., they undergo thermal decomposition so as to evolve gas such as nitrogen gas and carbonic acid gas, which results in thermal expansion of the light-emitting body 153. Therefore, as the foaming agent, an organic pyrolytic type preferably is used.

Subsequently, the light-emitting element 1 was produced using the same method as in Embodiment 11. The light-emission method and the mechanism of the light-emission also are the same as in Embodiment 11. That is to say, a voltage was applied between the electrodes 34a and 34b via lead wires 2 and 3. The voltage may be alternating current or direct current. In this step, an electric field is generated between the electrodes 34a and 34b (an arrow A). The application of the voltage causes the generation of the discharge at a surface of the coating layer 12, and the discharge occurs continuously like a chain reaction, thus emitting ultraviolet light and visible light.

Then, the thus generated ultraviolet light optically pumps the inorganic phosphor particles 11, thereby emitting visible light. Once the discharge begins, the discharge repeats like a chain reaction so as to generate ultraviolet light and visible light.

The mixture of the foaming agent causes the expansion of the volume and further enhances the discharge efficiency. Therefore, the light-emission by the light-emitting element 1 produced in Embodiment 12 was initiated at a smaller voltage value than that in Embodiment 11 by about 10%. Also, since elasticity of the light-emitting element is increased as compared with the light-emitting element produced in Embodiment 11, a light-emission initiation voltage value can be decreased, for example, by applying a pressure thereto. The mixture ratio of the foaming agent preferably is 1 to 10 wt % with reference to the particles 11. In the case of a mixture ratio larger than this, a mechanical strength may deteriorate, and in extreme cases, the light-emission intensity was degraded.

Embodiment 13

In Embodiments 7 to 12, the light-emitting elements 1 are produced by applying an inorganic phosphor paste on a surface of a porous body made up of insulative fibers 18 or by applying a paste in which insulative fiber 18 and inorganic phosphor particles 18 are mixed. In Embodiment 13, a light-emitting element 1 produced by sheet forming will be described, with reference to FIG. 13.

Figure 13:
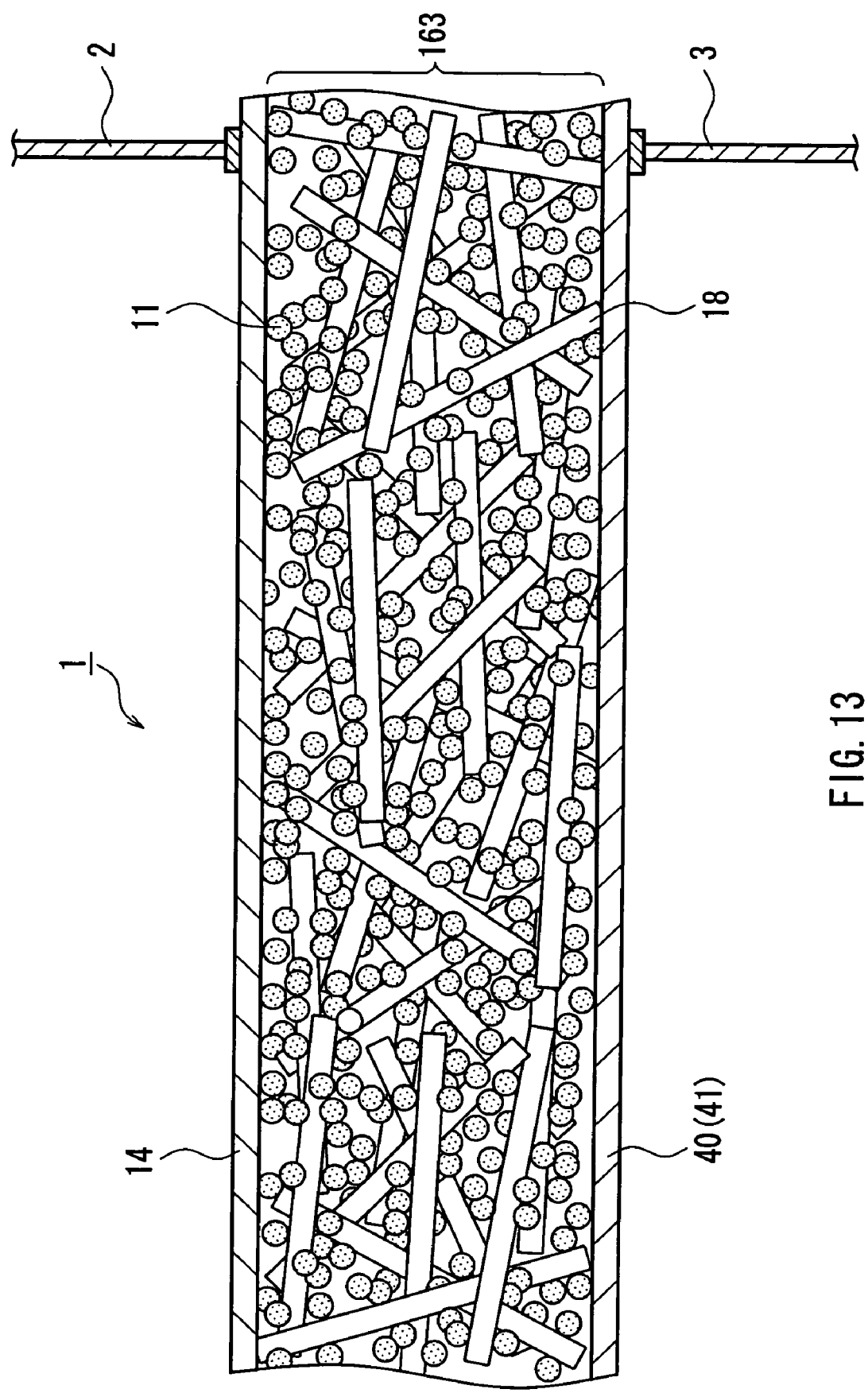
FIG. 13 is a cross-sectional view of a light-emitting element of Embodiment 13 of the present invention.

FIG. 13 is a cross-sectional view of a light-emitting element 1 of Embodiment 13 of the present invention, where reference numeral 11 denotes an inorganic phosphor particle, 18 denotes an insulative fiber containing a $SiO_2$—$Al_2O_3$—

CaO based substance as a main component, 163 denotes a porous light-emitting body made up of the particle 11 and the fiber 18, 14 denotes an ITO transparent electrode that is provided on a surface of the light-emitting body 163, 40 denotes a metal substrate and 1 denotes the light-emitting element.

The following describes a method for producing the light-emitting element 1 of Embodiment 13.

Firstly, inorganic phosphor particles 11 and insulative fibers 18 were mixed at a weight ratio of 2:1. For 100 g of the mixed powder, 35 g of butyl acetate, 0.5 g of BBP, 16 g of butylcellosolve, 8 g of ethanol and 12 g of butyral resin were mixed so as to prepare a slurry.

Next, using a sheet forming apparatus, this was shaped so as to have a sheet thickness of about 25 μm. Thereafter, the sheet was laminated to be two to ten layers by a laminating apparatus, and a thickness after the lamination was adjusted to be about 50 to 250 μm.

Next, a heat treatment was conducted in the air or in an atmosphere of nitrogen at 450 to 1200° C. for 0.25 to 10 hours, whereby a light-emitting body 163 was produced. A thickness of the light-emitting body 163 at this step was 45 to 250 μm.

Thereafter, an ITO transparent electrode 14 and a metal substrate 40 were connected to upper and lower surfaces of the light-emitting body 163, respectively, whereby a light-emitting element 1 was obtained.

Similarly to Embodiments 7 to 9, a voltage was applied between the electrodes 14 and 40. The voltage may be alternating current or direct current. The application of the voltage causes the generation of the discharge at a surface of the electrical insulative fibers 18, and the discharge occurs continuously like a chain reaction, thus emitting ultraviolet light and visible light.

Then, the thus generated ultraviolet light optically pumps the particles 11, thereby emitting visible light. Once the discharge begins, the discharge repeats like a chain reaction so as to generate ultraviolet light and visible light, and therefore in order to suppress adverse effects of this light on the light-emitting body 163, a value of the voltage after the initiation of the light-emission preferably is reduced to 50 to 80% of that applied at the initial state. When the voltage was applied at about 0.3 to 1.0 kV/mm by means of an AC power source or a DC power source, the discharge occurred, followed by the initiation of light-emission. A value of the current at this time was 0.1 mA or smaller. Furthermore, once the light-emission was initiated, the light-emission continued even when the value of the voltage was reduced. High-quality light-emission was confirmed similarly to Embodiment 7 for the three colors of blue, green and red.

The mechanism of the light-emission is similar to that of Embodiments 7 to 12. In order to generate the discharge effectively and obtain high-quality light-emission, the matters described in Embodiments 7 to 12 were executed, whereby favorable effects could be attained.

In Embodiment 13, when connecting the light-emitting body 163 with the electrode 14 and the metal substrate 40, a colloidal silica aqueous solution or a colloidal alumina aqueous solution was used as an adhesive, which was dried at 100 to 200° C., whereby a contact strength could be increased. Furthermore, by the immersion in a colloidal silica aqueous solution, followed by drying in the air at 100 to 200° C., the formation of the coating layer 12 was confirmed.

Furthermore, in Embodiment 13, the coating layer 12 was not provided. However, the same effects can be produced even when the coating layer 12 is provided. However, the deterioration due to discharge and the deterioration due to ultraviolet light could be suppressed well when the coating layer 12 was formed.

Embodiment 14

In the above Embodiments 7 to 13, organic binders are used, and therefore the manufacturing process requires a degreasing step and a heat treatment needs to be conducted in the air or in an atmosphere of nitrogen at 450 to 1200° C. for 0.25 to 10 hours. Thus, a method for producing a porous light-emitting body 173 by drying it in the air at 100 to 200° C. using an aqueous binder will be described below.

Figure 14:
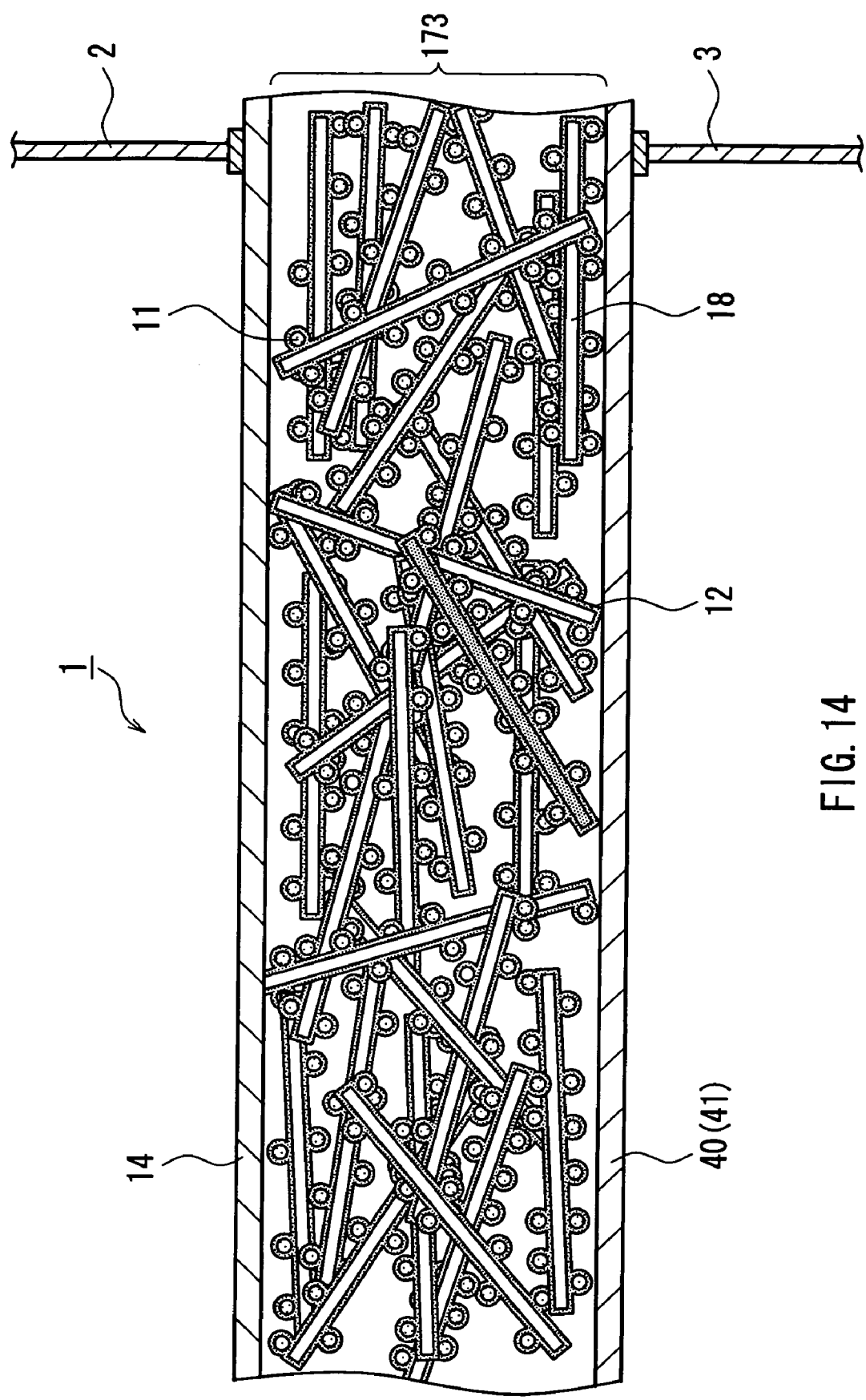
FIG. 14 is a cross-sectional view of a light-emitting element of Embodiment 14 of the present invention.

The following is a description for such an embodiment, with reference to FIG. 14. Firstly, inorganic phosphor powder 11 and insulative fibers 18 containing a $SiO_2$—$Al_2O_3$—CaO based substance as a main component were mixed at a weight ratio of 2:1. For 100 g of the mixed powder, a 5 wt % of colloidal silica aqueous solution or a 50 g of colloidal alumina aqueous solution was mixed so as to prepare a slurry.

Next, the slurry was placed on an Al metal foil 41, and drying was carried out by a drier at 100 to 200° C. for 0.25 to 10 hours, whereby a light-emitting body 173 with a thickness of about 25 to 1000 μm was produced. Thereafter, an ITO transparent electrode 14 was connected to an upper surface of the light-emitting body 173, whereby a light-emitting element 1 was obtained.

Similarly to Embodiment 13, a voltage was applied between the electrodes 14 and 40 via lead wires 2 and 3. The voltage may be alternating current or direct current. The application of the voltage causes the generation of the discharge at a surface of the insulative needle-like particles (fibers) 18, and the discharge occurs continuously like a chain reaction, thus emitting ultraviolet light and visible light.

Then, the thus generated ultraviolet light optically pumps the particles 11, thereby emitting visible light. Once the discharge begins, the discharge repeats like a chain reaction so as to generate ultraviolet light and visible light, and therefore in order to suppress adverse effects of this light on the light-emitting body 173, a value of the voltage after the initiation of the light-emission preferably is reduced to 50 to 80% of that applied at the initial state. When the voltage was applied at about 0.3 to 1.0 kV/mm by means of an AC power source or a DC power source, the discharge occurred, followed by the initiation of light-emission. A value of the current at this time was 0.1 mA or smaller. Furthermore, once the light-emission was initiated, the light-emission continued even when the value of the voltage was reduced. High-quality light-emission was confirmed similarly to Embodiment 7 for the three colors of blue, green and red.

The mechanism of the light-emission is similar to that of Embodiment 13. In order to generate the discharge effectively and obtain high-quality light-emission, the matters described in Embodiment 13 were executed, whereby favorable effects could be attained.

As for this step, the light-emitting body 173 can be formed also by conducting a heat treatment in the air or in an atmosphere of nitrogen at 450 to 1200° C. for 0.25 to 10 hours, and the generation of the same light-emission phenomenon was confirmed.

In Embodiment 14, the coating layer 12 was formed by the formation of colloidal particles on a surface of the inorganic phosphor particles 11 and the insulative fibers 18. That is to say, it was confirmed that the colloidal silica aqueous solution or the colloidal alumina aqueous solution that was used as the binder also formed the coating layer 12. Note here that, as an organic binder, instead of the colloidal silica aqueous solution or the colloidal alumina aqueous solution, polyimide, BCB (benzocyclobutene), a fluororesin such as PTFE (polytetrafluoroethylene) and a thermosetting resin or a thermoplastic resin such as aramid, PBO (poly-para-phenylene benzo-bis-oxazole), wholly aromatic polyester, epoxy resin, cyanate ester resin, phenol resole resin, PPE (poly-phenylene ether) resin, bismaleimide-triazine resin, unsaturated polyester resin, PPE (polyphenylene ether) resin, PEEK (poly-etheretherketone) resin and PEK (polyether-ketone) resin are available.

Embodiment 15

Figure 15:
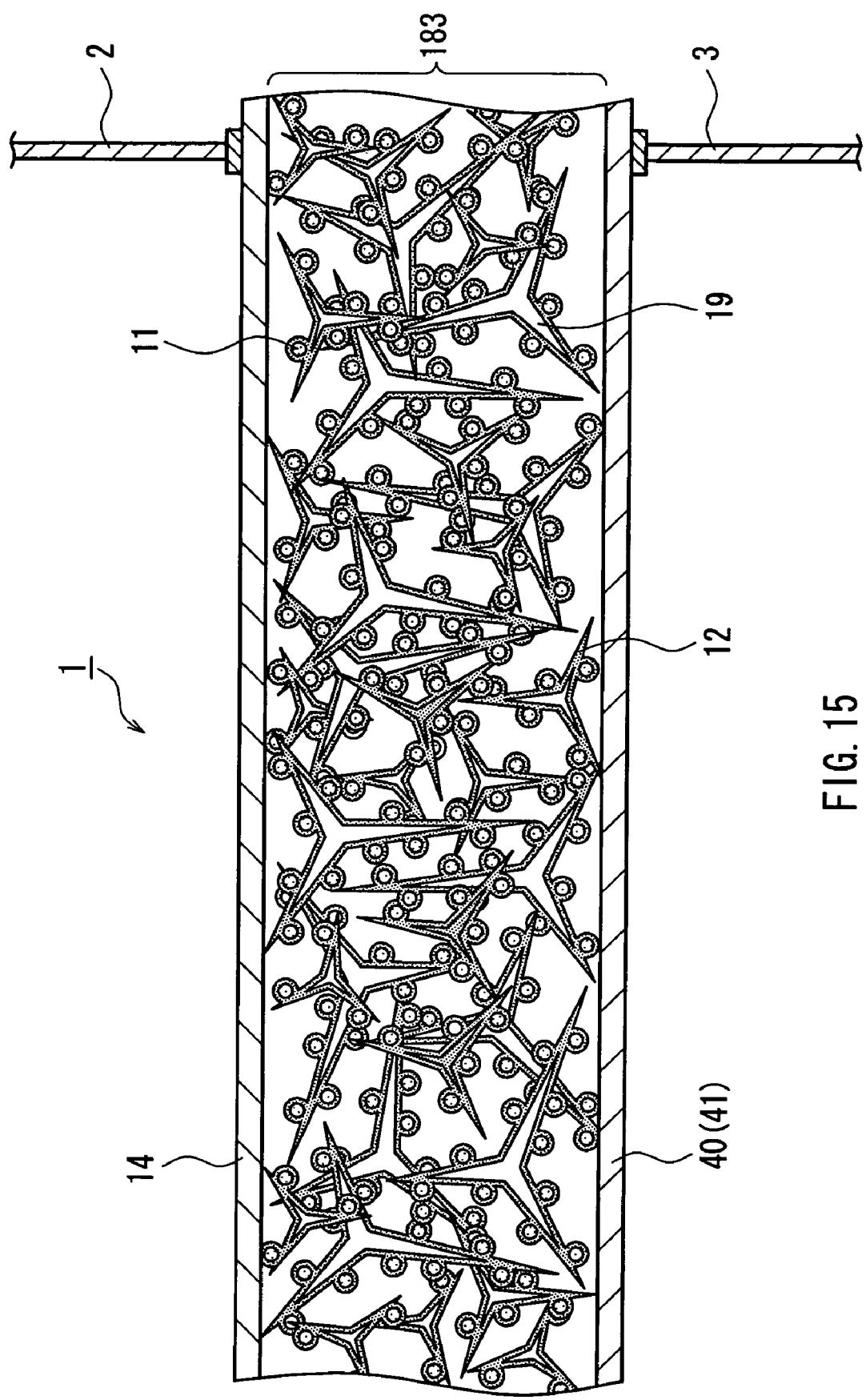
FIG. 15 is a cross-sectional view of a light-emitting element of Embodiment 15 of the present invention.

The following describes a method for producing a porous light-emitting body 183 using a ZnO based whisker as an insulative needle-like particle, with reference to FIG. 15. Firstly, particles 11 and ZnO whiskers 19 were mixed at a weight ratio of 2:1. For 100 g of the mixed powder, a 5 wt % of colloidal silica aqueous solution or a 50 g of colloidal alumina aqueous solution was mixed so as to prepare a slurry. Next, the slurry was placed on a Cu metal foil 41, and drying was carried out with a drier at 100 to 200° C. for 0.25 to 10 hours, whereby a light-emitting body 183 with a thickness of about 25 to 1000 µm was produced. Thereafter, an ITO transparent electrode 14 was connected to an upper surface of the light-emitting body 183, whereby a light-emitting element 1 was obtained.

Next, similarly to Embodiment 14, a voltage was applied between the electrodes 14 and 40 via lead wires 2 and 3. The voltage may be alternating current or direct current. The application of the voltage causes the generation of the discharge at a surface of the whiskers 19, and the discharge occurs continuously like a chain reaction, thus emitting ultraviolet light and visible light.

Then, the thus generated ultraviolet light optically pumps the particles 11, thereby emitting visible light. Once the discharge begins, the discharge repeats like a chain reaction so as to generate ultraviolet light and visible light, and therefore in order to suppress adverse effects of this light on the light-emitting body 183, a value of the voltage after the initiation of the light-emission preferably is reduced to 50 to 80% of that applied at the initial state. When the voltage was applied at about 0.3 to 1.0 kV/mm by means of an AC power source or a DC power source, the discharge occurred, followed by the initiation of light-emission. A value of the current at this time was 0.1 mA or smaller. Furthermore, once the light-emission was initiated, the light-emission continued even when the value of the voltage was reduced. High-quality light-emission was confirmed similarly to Embodiment 7 for the three colors of blue, green and red.

The mechanism of the light-emission is similar to that of Embodiment 14. In order to generate the discharge effectively and obtain high-quality light-emission, the matters described in Embodiment 14 were executed, whereby favorable effects could be attained.

As for this step, the light-emitting body 183 can be formed also by conducting a heat treatment in the air or in an atmosphere of nitrogen at 450 to 1200° C. for 0.25 to 10 hours, and the generation of the same light-emission phenomenon was confirmed.

In Embodiment 15, the coating layer 12 was formed by the formation of colloidal particles on a surface of the inorganic phosphor particles 11 and the insulative fibers 18. That is to say, it was confirmed that the colloidal silica aqueous solution or the colloidal alumina aqueous solution that was used as the binder also formed the coating layer 12.

Furthermore, in the above embodiments, a porous configuration is realized by using a $SiO_2$—$Al_2O_3$—CaO based insulative fiber, for example. However, the use of the ZnO whiskers facilitates the formation of a three-dimensional porous configuration, which further facilitates the generation of the discharge, thus resulting in enhancement of the light-emission intensity.

Although Cu was used as the electrode substrate, its resistance value was low, which bore comparison with Al.

Embodiment 16

The light-emitting elements 1 produced in Embodiments 1 to 15 were inserted in a quartz tube, which was then filled with inert gas such as Ne, Ar, Kr and Xe gas. Thereafter, when a voltage was applied to the light-emitting elements 1, light-emission was initiated at a voltage value of about 0.03 to 0.8 kV/mm. As compared with the case not filled with inert gas, the light-emitting elements indicated the voltage value decreased by about 60 to 80% and a higher brightness, a higher contrast, a higher recognition capability and a higher reliability. The reason for this is that the filling with the inert gas can provide an atmosphere that facilitates the generation of the discharge and the generation of ultraviolet light. In this case, however, glow discharge could be confirmed.

The thus obtained light-emitting elements 1 of Embodiments 1 to 16 are arranged two-dimensionally in a matrix form and a voltage applied to each of the light-emitting elements is turned ON or OFF by a driving circuit, whereby a flat display can be produced. With this flat display, a simple configuration can be realized at a low cost.

Although $SiO_2$—$Al_2O_3$—CaOO based compositions were used for the insulative fibers 18 in Embodiments 7 to 14, $Al_2O_3$, SiC, ZnO, $TiO_2$, MgO, BN, $Si_3N_4$ based fibers can produce the same effects as well.

INDUSTRIAL APPLICABILITY

As is evident from the above descriptions, according to the present invention, a light-emitting element that is reduced in a deterioration of brightness and a degradation of reliability of phosphors and does not require the vacuum encapsulation and the application of a high voltage, which are required for glow discharge, and still-higher level of thin-film technology can be provided. By arranging these light-emitting elements two-dimensionally in a matrix form, a flat display device with a simple configuration can be provided.

The invention claimed is:

1. A light-emitting element, comprising:
    a porous light-emitting body including an insulator having a void and an inorganic phosphor particle; and
    at least two electrodes provided so as to contact with a surface of the light-emitting body,
    wherein a voltage is applied to the at least two electrodes so as to generate discharge, and the light-emitting body is pumped by the discharge so as to emit light,
    wherein, three types of inorganic phosphor pastes including red, blue and green are applied in a stripe form on a surface of a sheet-form porous body made up of the insulator having a void, and
    wherein the inorganic phosphor paste contains a foaming agent.

2. The light-emitting element according to claim 1, wherein ultraviolet light is emitted by the discharge.

3. The light-emitting element according to claim 1, wherein a surface of the porous light-emitting body is formed of an insulative inorganic substance.

4. The light-emitting element according to claim 3, wherein the insulative inorganic substance is at least one substance selected from the group consisting of $Y_2O_3$, $Li_2O$, MgO, CaO, BaO, SrO, $Al_2O_3$, $SiO_2$, $MgTiO_3$, $CaTiO_3$, $BaTiO_3$, $SrTiO_3$, $ZrO_2$, $TiO_2$, $B_2O_3$, $PbTiO_3$, $PbZrO_3$ and $PbZrTIO_3$ (PZT).

5. The light-emitting element according to claim 1, wherein the porous light-emitting body is formed of an assembly of inorganic phosphor particles whose surfaces are coated with an insulative inorganic substance.

6. The light-emitting element according to claim 1, wherein a through hole is provided in the light-emitting body between the electrodes.

7. The light-emitting element according to claim 1, wherein a substance with resistance lower than that of an insulative metal oxide is dispersed within the light-emitting body between the electrodes.

8. The light-emitting element according to claim 1, wherein an inside of the light-emitting body is an atmosphere at atmospheric pressure or is filled with inert gas.

9. The light-emitting element according to claim 1, wherein the discharge is surface creepage.

10. The light-emitting element according to claim 1, wherein the insulator having a void is at least one selected from a fibrous structure and a foam having continuous bubbles.

11. The light-emitting element according to claim 10, wherein the fiber is one obtained by crushing insulative ceramic or glass.

12. The light-emitting element according to claim 10, wherein the fiber is a heat-resistant synthetic fiber with a heat distortion temperature of 220° C. or more.

13. The light-emitting element according to claim 10,
wherein the fiber has a diameter of 0.1 to 20.0 μm and a length of 0.5 to 100 μm, and
the inorganic phosphor particle has an average particle diameter of 0.1 to 5.0 μm.

14. The light-emitting element according to claim 1, wherein the light-emitting body is one obtained by attaching the inorganic phosphor particle to a surface of the insulator having a void.

15. The light-emitting element according to claim 1, wherein the insulator having a void is an inorganic substance that contains at least one type selected from the group consisting of Al, Si, Ca, Mg, Ti, Zn and B.

16. The light-emitting element according to claim 1, wherein a substance with resistance lower than that of the insulator is dispersed within the light-emitting body.

17. The light-emitting element according to claim 1, wherein assuming that a weight of the entire insulator is 1, a weight of the inorganic phosphor particle is within a range of 0.1 to 10.0.

18. The light-emitting element according to claim 1, wherein a porosity of the insulator having a void is within a range of 50% to 90%, inclusive.

19. A method for producing the light-emitting element according to claim 1, comprising the steps of:
a first step of applying an inorganic phosphor paste on a surface of a sheet-form porous body made up of the insulator having a void;
a second step of conducting a heat treatment for the insulator so as to form the porous light-emitting body;
a third step of forming the at least two electrodes contacting with the surface of the light-emitting body,
wherein, in the first step, three types of inorganic phosphor pastes including red, blue and green are applied in a stripe form, and
wherein the inorganic phosphor paste contains a foaming agent.

20. The method for producing the light-emitting element according to claim 19, wherein the inorganic phosphor paste contains an inorganic phosphor particle whose surface is covered with an insulative inorganic substance.

21. The method for producing the light-emitting element according to claim 20, wherein the covering with the insulative inorganic substance is conducted by immersing the inorganic phosphor particle in at least one solution selected from the group consisting of a metal complex solution, a metal alkoxide solution and a colloidal solution, followed by a heat treatment.

22. The method for producing the light-emitting element according to claim 20, wherein the covering with the insulative inorganic substance is conducted by attaching the insulative inorganic substance on a surface of the inorganic phosphor particle by any one method of evaporation, sputtering and CVD.

23. The method for producing the light-emitting element according to claim 19, wherein after the second step and before the third step, a surface of the light-emitting body is covered with an insulative inorganic substance by immersing the light-emitting body in at least one solution selected from the group consisting of a metal complex solution, a metal alkoxide solution and a colloidal solution, followed by a heat treatment.

24. The method for producing the light emitting element according to claim 19, wherein after the second step and before the third step, an insulative inorganic substance is attached to a surface of the light emitting body by any one method of evaporation, sputtering and CVD.

25. The method for producing the light-emitting element according to claim 19, wherein a light-shielding film or a groove is provided between different colored inorganic phosphors.

26. A method for producing the light-emitting element according to claim 1, comprising the steps of:
a first step of applying a paste containing an insulative fiber and an inorganic phosphor particle on a conductive substrate and conducting a heat treatment so as to form the porous light-emitting body,
a second step of forming the electrodes so as to contact with the surface of the light-emitting body,
wherein in the first step, three types of inorganic phosphor pastes including red, blue and green are applied in a stripe form, and
wherein the inorganic phosphor paste contains a foaming agent.

27. A method for producing the light-emitting element according to claim 1, comprising the steps of:
a first step of shaping a paste containing an insulative fiber and an inorganic phosphor particle and conducting a heat treatment so as to form the porous light-emitting body,
a second step of forming the at least two electrodes so as to contact with the surface of the light-emitting body,
wherein, in the first step, three types of inorganic phosphor pastes including red, blue and green are applied in a stripe form, and
wherein the inorganic phosphor paste contains a foaming agent.

28. The method for producing the light-emitting element according to claim 26, wherein after the first step and before the second step, the light-emitting body is immersed in at least one solution selected from the group consisting of a metal complex solution, a metal alkoxide solution and a colloidal solution, followed by a heat treatment, whereby a surface of the inorganic phosphor particle is covered with an insulative inorganic substance.

* * * * *